United States Patent

Kadowaki et al.

[11] Patent Number: 6,047,674
[45] Date of Patent: Apr. 11, 2000

[54] VALVE TIMING CONTROL APPARATUS FOR INTERNAL COMBUSTION ENGINE

[75] Inventors: Hisashi Kadowaki, Aichi-ken; Keiji Wakahara, Nagoya; Junya Morikawa, Toyota, all of Japan

[73] Assignee: Denso Corporation, Kariya, Japan

[21] Appl. No.: 09/150,029

[22] Filed: Sep. 9, 1998

[30] Foreign Application Priority Data

Sep. 12, 1997 [JP] Japan .................................. 9-248006
Oct. 23, 1997 [JP] Japan .................................. 9-291273
Aug. 21, 1998 [JP] Japan .................................. 10-235621

[51] Int. Cl.$^7$ .................................................. F01L 1/344
[52] U.S. Cl. ...................................... 123/90.15; 123/90.17; 123/198 D
[58] Field of Search ........................ 123/90.15, 90.16, 123/90.17, 90.31, 198 D

[56] References Cited

U.S. PATENT DOCUMENTS

| | | | |
|---|---|---|---|
| 4,960,083 | 10/1990 | Seki et al. | 123/90.16 |
| 4,960,094 | 10/1990 | Koike et al. | 123/425 |
| 4,960,095 | 10/1990 | Koike et al. | 123/425 |
| 4,996,954 | 3/1991 | Seki et al. | 123/90.16 |
| 5,024,191 | 6/1991 | Nagahiro et al. | 123/198 D |
| 5,529,034 | 6/1996 | Sone et al. | 123/90.17 |
| 5,738,053 | 4/1998 | Kato | 123/90.15 |

FOREIGN PATENT DOCUMENTS

| | | |
|---|---|---|
| 5-33715 | 2/1993 | Japan . |
| 7-91280 | 4/1995 | Japan . |
| 7-68921 | 7/1995 | Japan . |
| 2590384 | 12/1996 | Japan . |

*Primary Examiner*—Weilun Lo
*Attorney, Agent, or Firm*—Nixon & Vanderhye P.C.

[57] ABSTRACT

A valve timing control apparatus for an internal combustion engine includes a variable valve timing control mechanism of a hydraulic type which is provided in a drive force transmission arrangement for transmitting a drive force from a driving shaft to a driven shaft for actuating one of an engine-cylinder inlet valve and an engine-cylinder outlet valve, and which can relatively rotate one of the driving shaft and the driven shaft in a predetermined angular range. A detecting device operates for detecting a condition in which air enters hydraulic working fluid in the variable valve timing control mechanism. A trouble diagnosis device operates for implementing a trouble diagnosis on the variable valve timing control mechanism. An inhibiting device operates for inhibiting the trouble diagnosis implemented by the trouble diagnosis device when the detecting device detects the condition in which air enters hydraulic working fluid in the variable valve timing control mechanism.

8 Claims, 11 Drawing Sheets

VALVE TIMING CONTROL APPARATUS FOR INTERNAL COMBUSTION ENGINE

BACKGROUND OF THE INVENTION

1. Field of the Invention

This invention generally relates to a valve timing control apparatus for an internal combustion engine. This invention particularly relates to an apparatus for controlling the opening and closing timings of at least one of an inlet valve and an outlet valve in each engine cylinder in response to an operating condition of an internal combustion engine.

2. Description of the Related Art

A known valve timing control apparatus for an internal combustion engine includes a variable valve timing control mechanism which has a hydraulically-controllable cam pulley connected to a camshaft. The cam pulley can vary a cam phase difference relative to crank angle. The variation in the cam phase difference causes a variation in the opening and closing timings of, for example, an inlet valve of each engine cylinder. Generally, the valve timing is adjusted in response to the rotational speed of the engine or the load on the engine.

Regarding the variable valve timing control mechanism, it is known to provide a system for diagnosing a trouble in its operation by referring to the pressure of used hydraulic fluid. It is difficult for such a diagnosis system to detect a trouble which does not cause any abnormality in the hydraulic pressure.

Japanese patent 2590384 discloses a variable valve timing control mechanism provided with a system which diagnoses a trouble in its operation by referring to the phase difference between an engine crankshaft and an engine camshaft.

In a variable valve timing control mechanism of the hydraulic type, if air enters the hydraulic working fluid, the pressure of the fluid tends to be insufficient due to an easy variation in volume of the air. The insufficient hydraulic pressure impairs operation of the variable valve timing control mechanism. In addition, such an insufficient hydraulic pressure may be diagnosed as a trouble in the variable valve timing control mechanism.

SUMMARY OF THE INVENTION

It is an object of this invention to provide a valve timing control apparatus for an internal combustion engine which can accurately diagnose a trouble in operation of a variable valve timing control mechanism.

A first aspect of this invention provides a valve timing control apparatus for an internal combustion engine which comprising a variable valve timing control mechanism of a hydraulic type which is provided in a drive force transmission arrangement for transmitting a drive force from a driving shaft to a driven shaft for actuating one of an engine-cylinder inlet valve and an engine-cylinder outlet valve, and which can relatively rotate one of the driving shaft and the driven shaft in a predetermined angular range; detecting means for detecting a condition in which air enters hydraulic working fluid in the variable valve timing control mechanism; trouble diagnosis means for implementing a trouble diagnosis on the variable valve timing control mechanism; and inhibiting means for inhibiting the trouble diagnosis implemented by the trouble diagnosis means when the detecting means detects the condition in which air enters hydraulic working fluid in the variable valve timing control mechanism.

A second aspect of this invention is based on the first aspect thereof, and provides a valve timing control apparatus further comprising driving shaft rotational angle detecting means for detecting a rotational angle of the driving shaft; driven shaft rotational angle detecting means for detecting a rotational angle of the driven shaft; relative rotational angle calculating means for calculating an actual relative rotational angle which is equal to an actual phase difference between the rotational angle of the driving shaft which is detected by the driving shaft rotational angle detecting means and the rotational angle of the driven shaft which is detected by the driven shaft rotational angle detecting means; engine operating condition detecting means for detecting an operating condition of the engine; target relative rotational angle calculating means for calculating a target relative rotational angle which is equal to a target phase difference between the rotational angle of the driving shaft and the rotational angle of the driven shaft in response to the operating condition of the engine which is detected by the engine operating condition detecting means; control rotational angle calculating means for calculating a control rotational angle in response to a difference between the actual relative rotational angle calculated by the relative rotational angle calculating means and the target relative rotational angle calculated by the target relative rotational angle calculating means; and relative rotational angle control means for controlling the variable valve timing control mechanism to relatively rotate one of the driving shaft and the driven shaft in response to the control rotational angle calculated by the control rotational angle calculating means.

A third aspect of this invention provides a valve timing control apparatus for an internal combustion engine which comprises a variable valve timing control mechanism of a hydraulic type which is provided in a drive force transmission arrangement for transmitting a drive force from a driving shaft to a driven shaft for actuating one of an engine-cylinder inlet valve and an engine-cylinder outlet valve, and which can relatively rotate one of the driving shaft and the driven shaft in a predetermined angular range; driving shaft rotational angle detecting means for detecting a rotational angle of the driving shaft; driven shaft rotational angle detecting means for detecting a rotational angle of the driven shaft; relative rotational angle calculating means for calculating an actual relative rotational angle which is equal to an actual phase difference between the rotational angle of the driving shaft which is detected by the driving shaft rotational angle detecting means and the rotational angle of the driven shaft which is detected by the driven shaft rotational angle detecting means; engine operating condition detecting means for detecting an operating condition of the engine; target relative rotational angle calculating means for calculating a target relative rotational angle which is equal to a target phase difference between the rotational angle of the driving shaft and the rotational angle of the driven shaft in response to the operating condition of the engine which is detected by the engine operating condition detecting means; control rotational angle calculating means for calculating a control rotational angle in response to a difference between the actual relative rotational angle calculated by the relative rotational angle calculating means and the target relative rotational angle calculated by the target relative rotational angle calculating means; relative rotational angle control means for controlling the variable valve timing control mechanism to relatively rotate one of the driving shaft and the driven shaft in response to the control rotational angle calculated by the control rotational angle calculating means; detecting means for detecting a condition in which air enters hydraulic working fluid in the variable valve timing control mechanism; and relative rotational angle correcting means for correcting the target relative rotational angle toward a retarded angle side when the detecting means detects the condition in which air enters hydraulic working fluid in the variable valve timing control mechanism.

A fourth aspect of this invention is based on the first aspect thereof, and provides a valve timing control apparatus wherein the condition in which air enters hydraulic working fluid in the variable valve timing control mechanism is in a predetermined time interval within or after high rotational speed operation of the engine.

A fifth aspect of this invention is based on the first aspect thereof, and provides a valve timing control apparatus wherein the condition in which air enters hydraulic working fluid in the variable valve timing control mechanism corresponds to turn of a vehicle powered by the engine.

A sixth aspect of this invention is based on the first aspect thereof, and provides a valve timing control apparatus wherein the condition in which air enters hydraulic working fluid in the variable valve timing control mechanism is set on the basis of a behavior of a pressure of hydraulic working fluid.

A seventh aspect of this invention is based on the first aspect thereof, and provides a valve timing control apparatus wherein the condition in which air enters hydraulic working fluid in the variable valve timing control mechanism corresponds to travel of a vehicle powered by the engine on a rough road.

An eighth aspect of this invention provides a control apparatus for an internal combustion engine which comprises a valve timing control apparatus for controlling at least one of a valve lift amount, a valve timing related to an engine-cylinder inlet valve, and a valve timing related to an engine-cylinder outlet valve; malfunction detecting means for detecting malfunction of the valve timing control apparatus; and fail-safe means for implementing fail safe on the engine when the malfunction detecting means detects malfunction of the valve timing control apparatus.

A ninth aspect of this invention is based on the eighth aspect thereof, and provides a control apparatus further comprising second malfunction detecting means for detecting malfunction of a second apparatus provided on the engine which is affected by malfunction of the valve timing control apparatus, and inhibiting means contained in the fail-safe means for inhibiting the second malfunction detecting means from detecting malfunction of the second apparatus.

A tenth aspect of this invention is based on the ninth aspect thereof, and provides a control apparatus wherein the second malfunction detecting means comprises means for detecting misfire in the engine.

An eleventh aspect of this invention is based on the ninth aspect thereof, and provides a control apparatus wherein the second malfunction detecting means comprises means for detecting malfunction of a fuel supply apparatus.

A twelfth aspect of this invention is based on the ninth aspect thereof, and provides a control apparatus wherein the second malfunction detecting means comprises means for detecting malfunction of one of a front $O_2$ sensor and a rear $O_2$ sensor.

A thirteenth aspect of this invention is based on the ninth aspect thereof, and provides a control apparatus wherein the second malfunction detecting means comprises means for detecting deterioration of a catalytic converter.

A fourteenth aspect of this invention is based on the ninth aspect thereof, and provides a control apparatus wherein the second malfunction detecting means comprises means for detecting malfunction of a fuel vapor treating apparatus.

A fifteenth aspect of this invention is based on the eighth aspect thereof, and provides a control apparatus further comprising feedback control means for implementing knock-based feedback control of a spark timing in the engine; inhibiting means contained in the fail-safe means for inhibiting the feedback control means from implementing the knock-based feedback control of the spark timing; and spark timing control means contained in the fail-safe means for setting the spark timing to a first timing when the malfunction detecting means detects malfunction of the valve timing control apparatus, the first timing being retarded from a second timing to which the spark timing is set when the malfunction detecting means does not detect malfunction of the valve timing control apparatus.

A sixteenth aspect of this invention is based on the ninth aspect thereof, and provides a control apparatus further comprising invalidating means for invalidating a result of the detecting by the second malfunction detecting means.

DESCRIPTION OF THE PREFERRED EMBODIMENTS

First Embodiment

Figure 1:
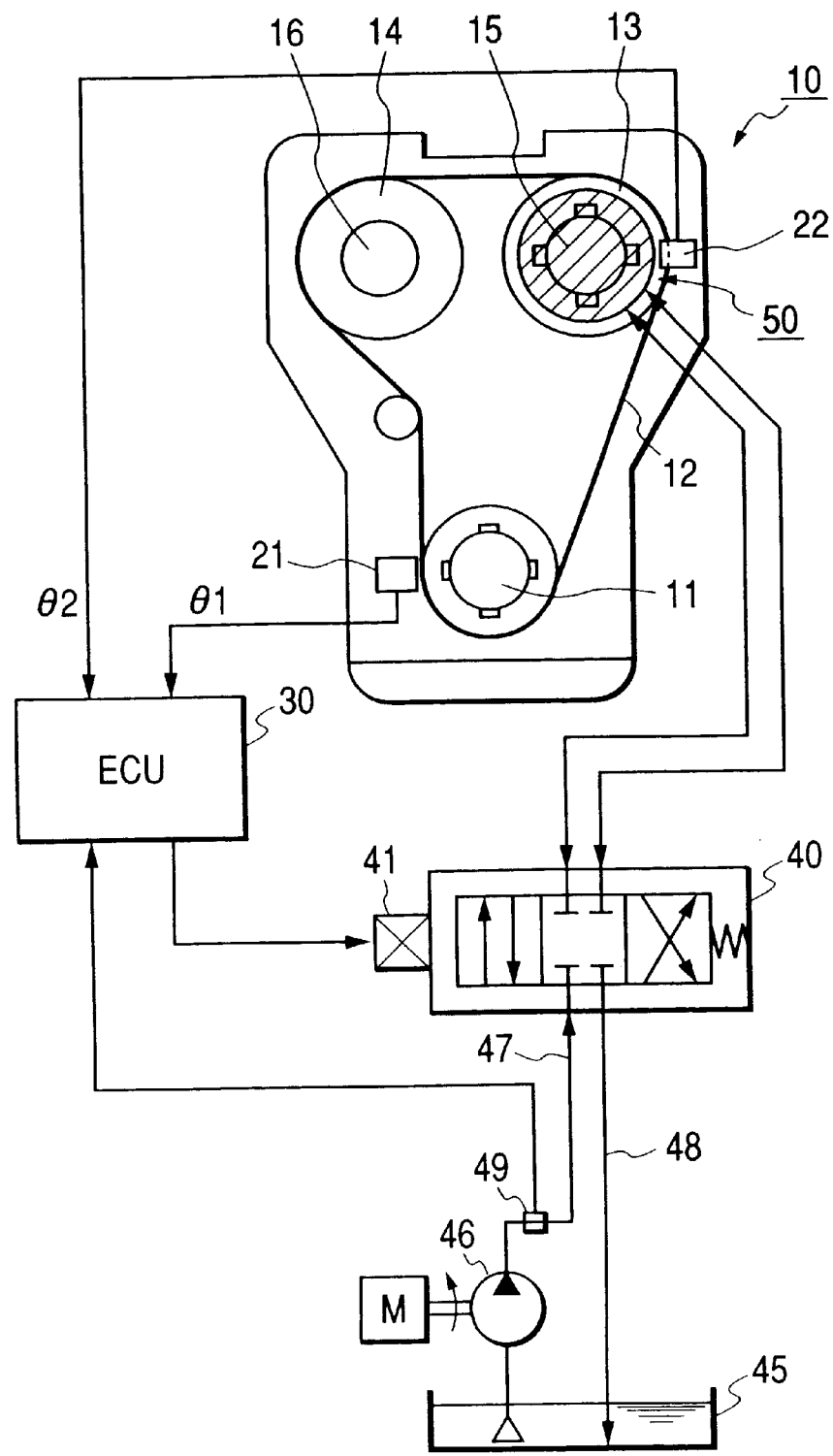
FIG. 1 is a diagram of an internal combustion engine of the double over head camshaft type, and a valve timing control apparatus according to a first embodiment of this invention.

With reference to FIG. 1, a valve timing control apparatus of a first embodiment of this invention operates for an internal combustion engine 10 having a crankshaft 11 which serves as a driving shaft with respect to a variable valve timing control mechanism 50. The valve timing control apparatus contains the variable valve timing control mechanism 50.

The crankshaft 11 is connected to a pair of chain sprockets 13 and 14 via a chain 12 in the valve timing control apparatus. A drive force can be transmitted from the crankshaft 11 to the chain sprockets 13 and 14. As the crankshaft 11 rotates, the chain sprockets 13 and 14 also rotate. Generally, the rotational speed of the chain sprockets 13 and 14 is equal to half the speed of rotation of the crankshaft 11. The chain sprocket 13 is connected to a camshaft 15 for driving engine-cylinder inlet valves (not shown). Normally, the camshaft 15 rotates together with the chain sprocket 13. The camshaft 15 serves as a driven shaft with respect to the variable valve timing control mechanism 50. The chain sprocket 14 is mounted on a camshaft 16 for driving engine-cylinder outlet valves (not shown). The camshaft 16 rotates together with the chain sprocket 14.

A crankshaft position sensor 21 is associated with the crankshaft 11. The crankshaft position sensor 21 outputs a pulse signal θ1 representing the angular position of the crankshaft 11. A camshaft position sensor 22 is associated with the camshaft 15. The camshaft position sensor 22 outputs a pulse signal θ2 representing the angular position of the camshaft 15.

An electronic control unit (ECU) 30 receives the output signals θ1 and θ2 of the crankshaft position sensor 21 and the camshaft position sensor 22. The ECU 30 includes a microcomputer or a logic operation circuit having a combination of a CPU, a ROM, a general RAM, a backup RAM, an input/output port, and bus lines. The ECU 30 operates in accordance with a program stored in the ROM.

An air pressure sensor (not shown) detects the intake air pressure or the intake manifold pressure in the engine 10, that is, the pressure in a region of an air induction passage (an air intake passage) of the engine 10 downstream of an engine throttle valve. The ECU 30 receives an output signal of the air pressure sensor which represents the detected intake manifold pressure.

A temperature sensor (not shown) detects the temperature of coolant in the engine 10. The ECU 30 receives an output signal of the temperature sensor which represents the detected engine coolant temperature.

The ECU 30 calculates an actual rotational angle AVTA of the camshaft 15 relative to the crankshaft 11 on the basis of the output signals θ1 and θ2 of the crankshaft position sensor 21 and the camshaft position sensor 22. In addition, the ECU 30 calculates a target rotational angle AVTT of the camshaft 15 relative to the crankshaft 11 on the basis of the output signals of sensors including the crankshaft position sensor 21 and the air pressure sensor. Furthermore, the ECU 30 calculates the rotational engine speed NE, that is, the speed of rotation of the crankshaft 11 on the basis of the output signal θ1 of the crankshaft position sensor 21.

A spool valve 40 which serves as an oil-flow control valve (OCV) can be actuated by a linear solenoid 41. The spool valve 40 is disposed in hydraulic passages extending among a tank 45, a pump 46, and the variable valve timing control mechanism (VVT) 50. The tank 45 contains hydraulic fluid. The pump 46 draws hydraulic fluid from the tank 45, and pumps hydraulic fluid toward the VVT 50 via a fluid feed passage 47 and the spool valve 40. The state or the position of the spool valve 40 is controlled by the linear solenoid 41. The spool valve 40 can adjust the rate of hydraulic-fluid flow to the VVT 50 in response to the duty cycle or the duty factor of a drive pulse signal applied to the linear solenoid 41. The VVT 50 is provided between the chain sprocket 13 and the camshaft 15. The VVT 50 varies the angular difference (the phase difference) between the sprocket 13 and the camshaft 15, that is, the rotational angle of the camshaft 15 relative to the crankshaft 11 in response to hydraulic fluid fed via the spool valve 40. Hydraulic fluid can return from the VVT 50 to the tank 45 via the spool valve 40 and a fluid return passage 48.

The ECU 30 calculates the difference between the actual rotational angle AVTA and the target rotational angle AVTT of the camshaft 15 relative to the crankshaft 11. The ECU 30 generates a fixed-frequency drive pulse signal for the linear solenoid 41 which has a duty cycle or a duty factor depending on the calculated difference between the actual rotational angle AVTA and the target rotational angle AVTT of the camshaft 15 relative to the crankshaft 11. Thereby, the actual rotational angle AVTA of the camshaft 15 relative to the crankshaft 11 can be equalized to the target rotational angle AVTT thereof.

A hydraulic pressure sensor 49 is disposed in a region of the fluid feed passage 47 downstream of the pump 46. The hydraulic pressure sensor 49 detects the pressure of hydraulic fluid transmitted from the pump 46 toward the VVT 50. In other words, the hydraulic pressure sensor 49 detects the pressure of hydraulic fluid at the outlet of the pump 46. The hydraulic pressure sensor 49 outputs a signal to the ECU 30 which represents the detected hydraulic pressure Poil.

The engine 10 drives a vehicle provided with a power steering switch (not shown). When a vehicle steering wheel is out of its neutral position, the power steering switch is in its ON position. When the vehicle steering wheel is in its neutral position, the power steering switch is in its OFF position. The power steering switch outputs a signal to the ECU 30 which represents the current position thereof.

The vehicle has a body provided with a vehicle speed sensor (not shown) for detecting the speed of the vehicle body. The vehicle speed sensor outputs a signal to the ECU 30 which represents the detected vehicle speed.

A warning lamp (not shown) is located in the interior of the vehicle. The warning lamp is connected to the ECU 30. The warning lamp can be activated and deactivated by the ECU 30.

The crankshaft position sensor 21 and the camshaft position sensor 22 are designed to implement the following processes. During every revolution of the crankshaft 11, N pulses are successively outputted from the crankshaft position sensor 21. Here, N denotes a predetermined natural number. During every revolution of the camshaft 15, N pulses are successively outputted from the camshaft position sensor 22. The number N is chosen to satisfy a condition as "N<360/θmax" where θmax denotes the maximum value of timing conversion related to the camshaft 15 which is expressed in unit of degree in crank angle (CA). Accordingly, a pulse in the output signal θ1 of the crankshaft position sensor 21, and a pulse in the output signal θ2 of the camshaft position sensor 22 which occurs immediately after the pulse in the signal θ1 can be used in calculating the actual rotational angle AVTA of the camshaft 15 relative to the crankshaft 11.

Figure 2:
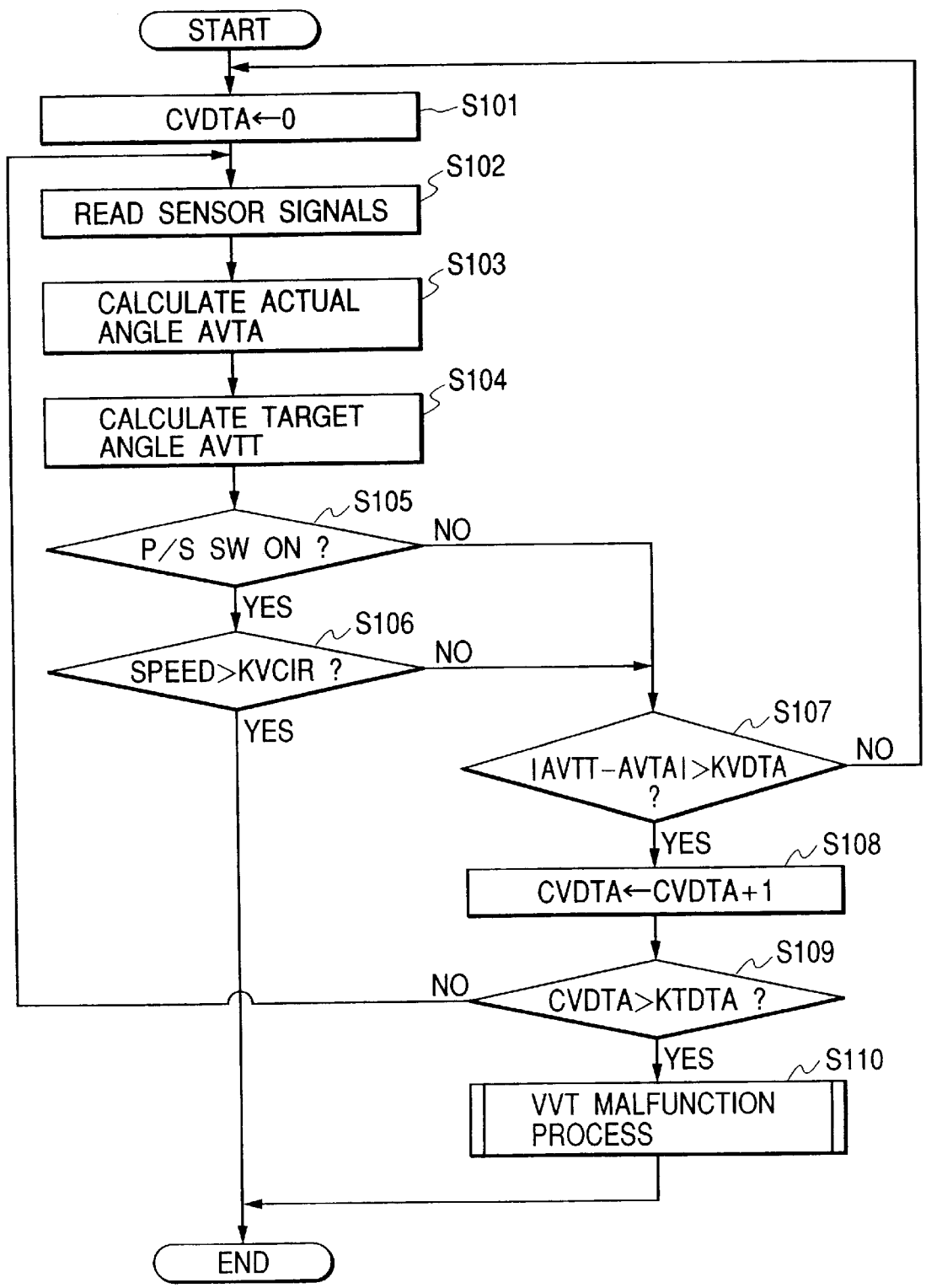
FIG. 2 is a flowchart of a segment of a program for an electronic control unit in FIG. 1.

As previously explained, the ECU 30 operates in accordance with a program stored in its internal ROM. FIG. 2 is a flowchart of a segment (routine) of the program which is designed to diagnose a trouble in or a failure of the VVT 50. In the case where the engine 10 has four cylinders, the program segment in FIG. 2 is executed for every 180° CA (crank angle).

As shown in FIG. 2, a first step S101 of the program segment clears the variable CVDTA to "0". The variable CVDTA is used as an indication of the time of continuation or the duration of wrong operation of the VVT 50. After the step S101, the program advances to a step S102.

The step S102 reads the current states of the output signals θ1 and θ2 of the crankshaft position sensor 21 and the camshaft position sensor 22. The step S102 reads the current state of the output signal of the power steering switch. The step S102 reads the current value of the rotational engine speed NE (rpm). The step S102 derives the current value of the intake manifold pressure PM ($kgf/cm^2$) from the output signal of the air pressure sensor. The step S102 derives the current value of the vehicle speed from the output signal of the vehicle speed sensor.

A step S103 following the step S102 calculates the actual rotational angle AVTA of the camshaft 15 relative to the crankshaft 11 from the current states of the output signals θ1 and θ2 of the crankshaft position sensor 21 and the camshaft position sensor 22 by referring to an equation as "AVTA= θ1−θ2".

A step S104 subsequent to the step S103 calculates the target rotational angle AVTT of the camshaft 15 relative to the crankshaft 11 from the current rotational engine speed NE (rpm) and the current intake manifold pressure PM ($kgf/cm^2$).

Figure 3:
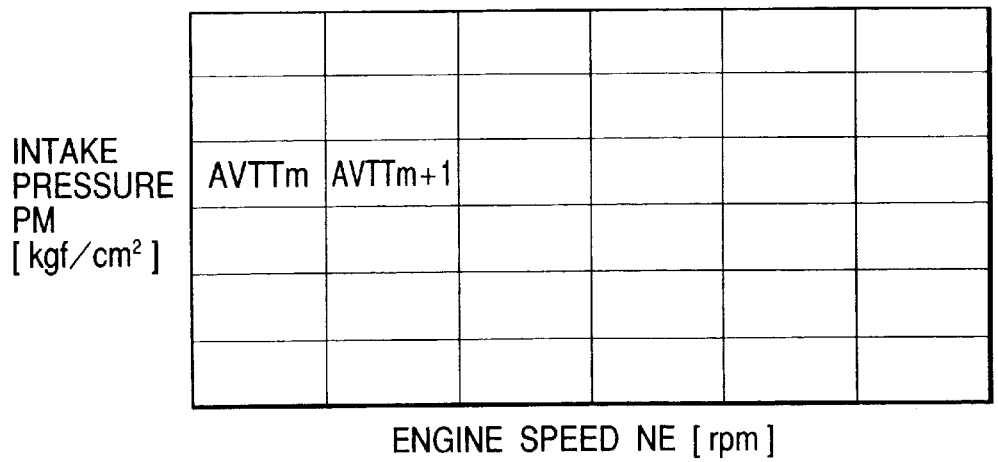
FIG. 3 is a diagram of a table map which indicates a predetermined relation among a target rotational angle AVTT, a rotational engine speed NE (rpm), and an intake manifold pressure PM (kgf/cm$^2$).

The ROM in the ECU 30 stores information of a table map which indicates a predetermined relation among the target rotational angle AVTT, the rotational engine speed NE (rpm), and the intake manifold pressure PM ($kgf/cm^2$). An example of the table map is shown in FIG. 3. The step S104 implements the calculation of the target rotational angle AVTT by referring to the table map in FIG. 3.

A step S105 following the step S104 decides whether or not the power steering switch is in its ON position, that is, whether or not the vehicle steering wheel is out of its neutral position, by referring to the current state of the output signal thereof. When it is decided that the power steering switch is in its ON position, that is, when it is decided that the vehicle steering wheel is out of its neutral position, the program advances from the step S105 to a step S106. Otherwise, the program advances from the step S105 to a step S107.

The step S106 decides whether or not the current vehicle speed exceeds a predetermined reference speed KVCIR. When it is decided that the current vehicle speed exceeds the reference speed KVCIR, the program exits from the step S106 and then the current execution cycle of the program segment ends. When it is decided that the current vehicle speed does not exceed the reference speed KVCIR, the program advances from the step S106 to the step S107.

Accordingly, in the case where the vehicle is turning and is moving at a speed higher than the reference speed KVCIR, main program steps for a trouble diagnosis on the VVT 50 remain unexecuted. It should be noted that under these vehicle operating conditions, there is a chance of the entry of air into hydraulic fluid in the VVT 50.

The step S107 calculates the absolute value |AVTT−AVTA| of the difference between the actual rotational angle AVTA and the target rotational angle AVTT which have been given by the steps S103 and S104. The step S107 decides whether or not the absolute value |AVTT−AVTA| of the difference exceeds a predetermined reference angular value KVDTA. When it is decided that the absolute value |AVTT−AVTA| of the difference exceeds the reference angular value KVDTA, the program advances from the step S107 to a step S108. In this case, it is thought that operation of the VVT 50 is wrong. When it is decided that the absolute value |AVTT−AVTA| of the difference does not exceed the reference angular value KVDTA, the program returns from the step S107 to the step S101. In this case, it is thought that operation of the VVT 50 is good.

The step S108 increments the wrong-operation continuation time CVDTA by "1". After the step S108, the program advances to a step S109.

The step S109 decides whether or not the wrong-operation continuation time CVDTA exceeds a predetermined reference time KTDTA. When it is decided that the wrong-operation continuation time CVDTA exceeds the reference time KTDTA, the program advances from the step S109 to a step S110. When it is decided that the wrong-operation continuation time CVDTA does not exceed the reference time KTDTA, the program returns from the step S109 to the step S102.

The step S110 sets a flag for indicating that the VVT 50 fails. In addition, the step S110 activates the warning lamp. After the step S110, the current execution cycle of the program segment ends.

As previously mentioned, in the valve timing control apparatus of the first embodiment of this invention, the crankshaft 11 of the engine 10 serves as the driving shaft with respect to the VVT 50. The camshaft 15 for driving the engine-cylinder inlet valves serves as the driven shaft with respect to the VVT 50. The drive force is transmitted from the crankshaft 11 to the camshaft 15 by a drive-force transmission arrangement including the chain 12 and the chain sprocket 13. The VVT 50 is provided in the drive-force transmission arrangement. The VVT 50 can vary the rotational angle of the camshaft 15 relative to the crankshaft 11 in a predetermined angular range. The crankshaft position sensor 21 detects the angular position of the crankshaft 11. The camshaft position sensor 22 detects the angular position of the camshaft 15. The ECU 30 calculates the difference (the phase difference) between the angular positions of the crankshaft 11 and the camshaft 15 which are detected by the crankshaft position sensor 21 and the camshaft position sensor 22. The calculated phase difference agrees with the actual rotational angle AVTA of the camshaft 15 relative to the crankshaft 11. The ECU 30 calculates the target rotational angle AVTT of the camshaft 15 relative to the crankshaft 11 on the basis of the operating conditions of the engine 10. The ECU 30 calculates a desired drive force to the VTT 50 on the basis of the difference between the target rotational angle AVTT and the actual rotational angle AVTA. The desired drive force to the VTT 50 is given as a desired control rotational angle. The ECU 30 controls the VTT 50 via the linear solenoid 41 in response to the difference between the target rotational angle AVTT and the actual rotational angle AVTA to move the actual rotational angle AVTA toward the target rotational angle AVTT. Thus, the VTT 50 is feedback-controlled to equalize the actual rotational angle AVTA and the target rotational angle AVTT. The ECU 30 detects the presence and the absence of conditions under which air tends to enter hydraulic fluid in the VVT 50. When the presence of such conditions is detected, the ECU 30 inhibits the trouble diagnosis on the VTT 50 from being implemented.

If air enters hydraulic fluid in the VTT 50, the pressure of hydraulic fluid therein tends to be insufficient due to an easy variation in volume of the air. It is possible to prevent such an insufficient hydraulic pressure from being diagnosed as a trouble in the feedback control of the VVT 50 since the ECU 30 inhibits the execution of the trouble diagnosis on the VTT 50 in these conditions.

The valve timing control apparatus of the first embodiment of this invention may be modified so that the VTT 50 will not be feedback-controlled. According to this modification, the crankshaft 11 of the engine 10 serves as the driving shaft with respect to the VVT 50. The camshaft 15 for driving the engine-cylinder inlet valves serves as the driven shaft with respect to the VVT 50. The drive force is transmitted from the crankshaft 11 to the camshaft 15 by a drive-force transmission arrangement including the chain 12 and the chain sprocket 13. The VVT 50 is provided in the drive-force transmission arrangement. The VVT 50 can vary the rotational angle of the camshaft 15 relative to the crankshaft 11 in a predetermined angular range. The ECU 30 detects the presence and the absence of conditions under which air tends to enter hydraulic fluid in the VVT 50. When the presence of such conditions is detected, the ECU 30 inhibits the trouble diagnosis on the VTT 50 from being implemented.

If air enters hydraulic fluid in the VTT 50, the pressure of hydraulic fluid therein tends to be insufficient due to an easy variation in volume of the air. The above-mentioned modification can prevent such an insufficient hydraulic pressure from being diagnosed as a trouble since the ECU 30 inhibits the execution of the trouble diagnosis on the VTT 50 in these conditions.

In the valve timing control apparatus of the first embodiment of this invention, it is thought that the conditions under which air tends to enter hydraulic fluid in VVT 50 occur during turn of the vehicle. In fact, air tends to enter hydraulic fluid in the VVT 50 and the pressure of hydraulic fluid tends to be unstable during turn of the vehicle. The execution of the trouble diagnosis on the VTT 50 is inhibited during turn of the vehicle. Thus, it is possible to prevent temporary wrong operation of the VTT 50, which is caused by the entry of air into hydraulic fluid, from being diagnosed as a failure of the VTT 50 during turn of the vehicle.

The valve timing control apparatus of the first embodiment of this invention decides that the vehicle is turning in the case where the power steering switch is in its ON position and the current vehicle speed exceeds the reference speed KVCIR. Turn of the vehicle may be detected from other parameters such as the lateral acceleration of the vehicle body which is sensed by a lateral G sensor, the steering angle of the steering wheel, the rotational engine speed, and the engine load.

Second Embodiment

A second embodiment of this invention is similar to the first embodiment thereof except for design changes indicated later.

Figure 4:
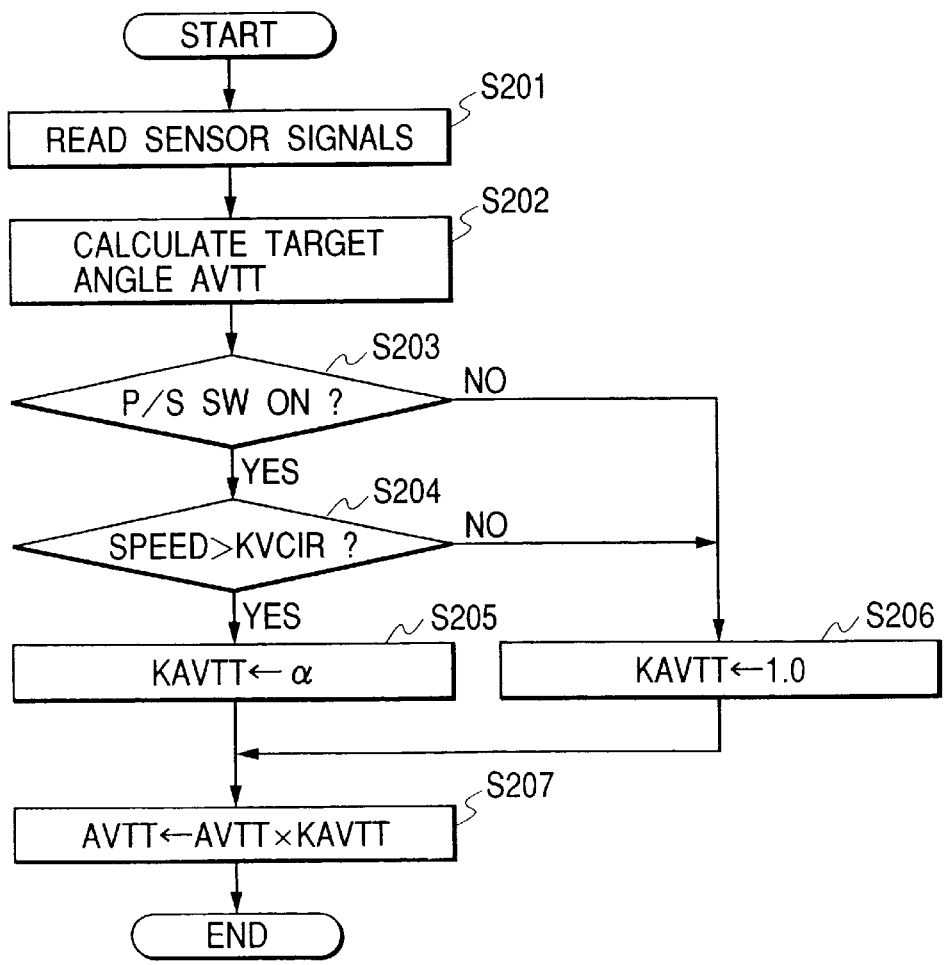
FIG. 4 is a flowchart of a segment of a program for an electronic control unit in a second embodiment of this invention.

In the second embodiment of this invention, the ECU 30 operates in accordance with a program stored in its internal ROM. FIG. 4 is a flowchart of a segment (routine) of the program which is designed to correct the target rotational angle AVTT of the camshaft 15 relative to the crankshaft 11. In the case where the engine 10 has four cylinders, the program segment in FIG. 4 is executed for every 180° CA (crank angle).

As shown in FIG. 4, a first step S201 of the program segment reads the current states of the output signals θ1 and θ2 of the crankshaft position sensor 21 and the camshaft position sensor 22. The step S201 reads the current state of the output signal of the power steering switch. The step S201 reads the current value of the rotational engine speed NE (rpm). The step S201 derives the current value of the intake manifold pressure PM (kgf/cm$^2$) from the output signal of the air pressure sensor. The step S201 derives the current value of the vehicle speed from the output signal of the vehicle speed sensor.

A step S202 following the step S201 calculates the target rotational angle AVTT of the camshaft 15 relative to the crankshaft 11 from the current rotational engine speed NE (rpm) and the current intake manifold pressure PM (kgf/cm$^2$) as the step S104 in FIG. 2 does.

A step S203 subsequent to the step S202 decides whether or not the power steering switch is in its ON position, that is, whether or not the vehicle steering wheel is out of its neutral position, by referring to the current state of the output signal thereof. When it is decided that the power steering switch is in its ON position, that is, when it is decided that the vehicle steering wheel is out of its neutral position, the program advances from the step S203 to a step S204. Otherwise, the program advances from the step S203 to a step S206.

The step S204 decides whether or not the current vehicle speed exceeds the reference speed KVCIR. When it is decided that the current vehicle speed exceeds the reference speed KVCIR, the program advances from the step S204 to a step S205. Otherwise, the program advances from the step S204 to the step S206.

The step S205 sets a corrective coefficient KAVTT to a predetermined value "α" smaller than 1.0. After the step S205, the program advances to a step S207.

The step S206 sets the corrective coefficient KAVTT to 1.0. After the step S206, the program advances to the step S207.

The step S207 updates or corrects the target rotational angle AVTT in response to the corrective coefficient KAVTT by referring to a program statement as "AVTT= AVTT•KAVTT". Thus, the step S207 determines the correction-resultant target rotational angle AVTT. The correction-resultant target rotational angle AVTT will be used by the step S107 in FIG. 2. After the step S207, the current execution cycle of the program segment ends.

Accordingly, in the case where the vehicle is turning and is moving at a speed higher than the reference speed KVCIR, the target rotational angle AVTT is corrected by the steps S205 and S207 toward a retarded angle side.

In the valve timing control apparatus of the second embodiment of this invention, the crankshaft 11 of the engine 10 serves as the driving shaft with respect to the VVT 50. The camshaft 15 for driving the engine-cylinder inlet valves serves as the driven shaft with respect to the VVT 50. The drive force is transmitted from the crankshaft 11 to the camshaft 15 by a drive-force transmission arrangement including the chain 12 and the chain sprocket 13. The VVT 50 is provided in the drive-force transmission arrangement. The VVT 50 can vary the rotational angle of the camshaft 15 relative to the crankshaft 11 in a predetermined angular range. The crankshaft position sensor 21 detects the angular position of the crankshaft 11. The camshaft position sensor 22 detects the angular position of the camshaft 15. The ECU 30 calculates the difference (the phase difference) between the angular positions of the crankshaft 11 and the camshaft 15 which are detected by the crankshaft position sensor 21 and the camshaft position sensor 22. The calculated phase difference agrees with the actual rotational angle AVTA of the camshaft 15 relative to the crankshaft 11. The ECU 30 calculates the target rotational angle AVTT of the camshaft 15 relative to the crankshaft 11 on the basis of the operating conditions of the engine 10. The ECU 30 calculates a desired drive force to the VTT 50 on the basis of the difference between the target rotational angle AVTT and the actual rotational angle AVTA. The desired drive force to the VTT 50 is given as a desired control rotational angle. The ECU 30 controls the VTT 50 via the linear solenoid 41 in response to the difference between the target rotational angle AVTT and the actual rotational angle AVTA to move the actual rotational angle AVTA toward the target rotational angle AVTT. Thus, the VTT 50 is feedback-controlled to equalize the actual rotational angle AVTA and the target rotational angle AVTT. The ECU 30 detects the presence and the absence of conditions under which air tends to enter hydraulic fluid in the VVT 50. When the presence of such conditions is detected, the ECU 30 corrects the target rotational angle AVTT toward the retarded angle side.

If air enters hydraulic fluid in the VTT 50, the pressure of hydraulic fluid therein tends to be insufficient due to an easy variation in volume of the air. It is possible to prevent such an insufficient hydraulic pressure from being diagnosed as a trouble in the feedback control of the VVT 50 since the ECU 30 corrects the target rotational angle AVTT toward the retarded angle side in these conditions.

In the valve timing control apparatus of the second embodiment of this invention, it is thought that the conditions under which air tends to enter hydraulic fluid in VVT 50 occur during turn of the vehicle. In fact, air tends to enter hydraulic fluid in the VVT 50 and the pressure of hydraulic fluid tends to be unstable during turn of the vehicle. The target rotational angle AVTT is corrected toward the retarded angle side during turn of the vehicle. Thus, it is possible to prevent temporary wrong operation of the VTT 50, which is caused by the entry of air into hydraulic fluid, from being diagnosed as a failure of the VTT 50 during turn of the vehicle.

The valve timing control apparatus of the second embodiment of this invention decides that the vehicle is turning in the case where the power steering switch is in its ON position and the current vehicle speed exceeds the reference speed KVCIR. Turn of the vehicle may be detected from other parameters such as the lateral acceleration of the vehicle body which is sensed by a lateral G sensor, the steering angle of the steering wheel, the rotational engine speed, and the engine load.

Third Embodiment

A third embodiment of this invention is similar to the first embodiment thereof except for design changes indicated later.

Figure 5:
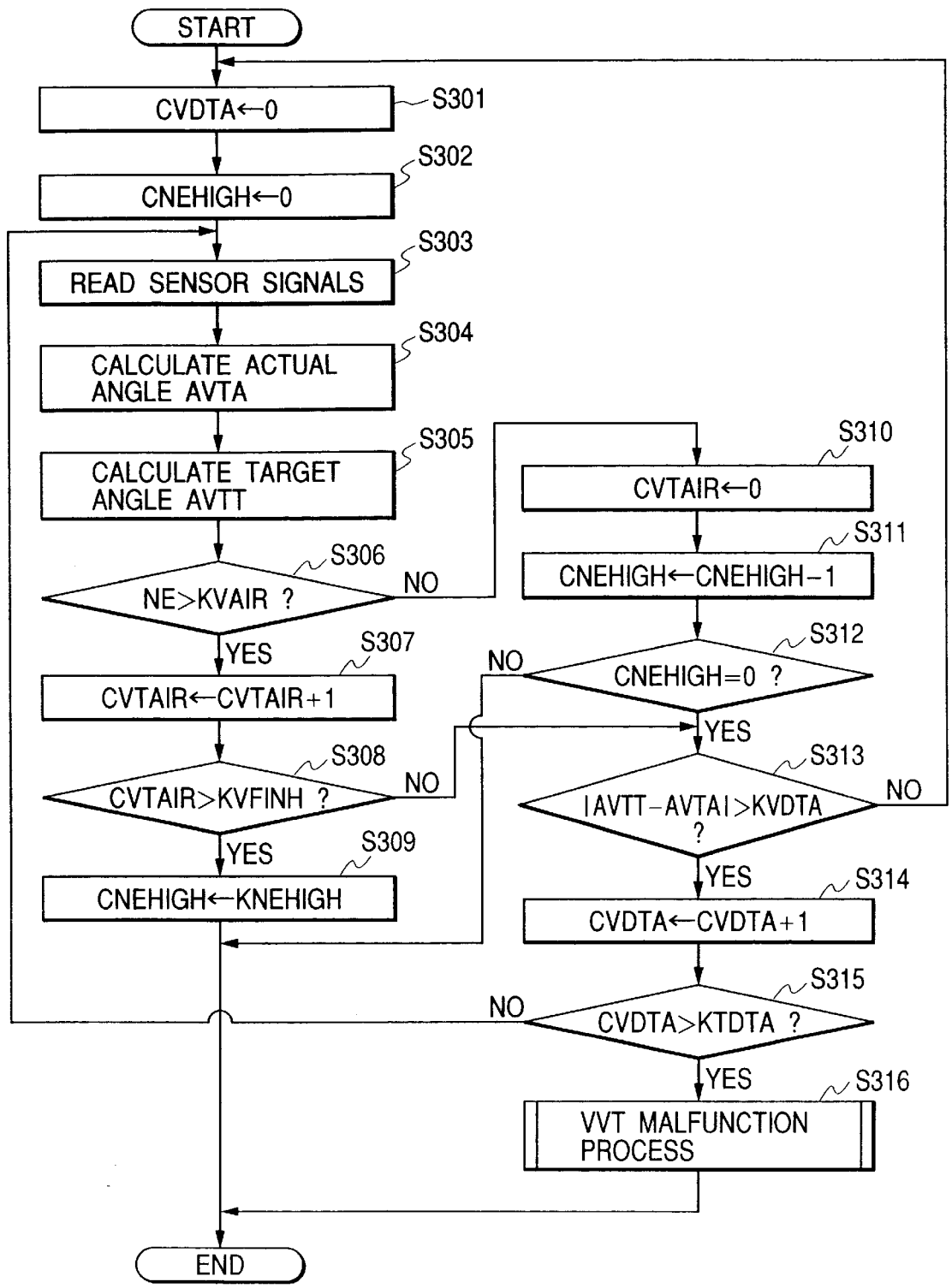
FIG. 5 is a flowchart of a segment of a program for an electronic control unit in a third embodiment of this invention.

In the third embodiment of this invention, the ECU 30 operates in accordance with a program stored in its internal ROM. FIG. 5 is a flowchart of a segment (routine) of the program which is designed to diagnose a trouble in or a failure of the VVT 50. In the case where the engine 10 has four cylinders, the program segment in FIG. 5 is executed for every 180° CA (crank angle).

As shown in FIG. 5, a first step S301 of the program segment clears the variable CVDTA to "0". The variable CVDTA is used as an indication of the time of continuation or the duration of wrong operation of the VVT 50.

A step S302 following the step S301 clears the variable CNEHIGH to "0". The variable CNEHIGH is used as an indication of a count number related to the lapse of time after the end of high-speed operation. After the step S302, the program advances to a step S303.

The step S303 reads the current states of the output signals θ1 and θ2 of the crankshaft position sensor 21 and the camshaft position sensor 22. The step S303 reads the current value of the rotational engine speed NE (rpm). The step S303 derives the current value of the intake manifold pressure PM (kgf/cm$^2$) from the output signal of the air pressure sensor.

A step S304 following the step S303 calculates the actual rotational angle AVTA of the camshaft 15 relative to the crankshaft 11 from the current states of the output signals θ1 and θ2 of the crankshaft position sensor 21 and the camshaft position sensor 22 by referring to an equation as "AVTA= θ1−θ2".

A step S305 subsequent to the step S304 calculates the target rotational angle AVTT of the camshaft 15 relative to the crankshaft 11 from the current rotational engine speed NE (rpm) and the current intake manifold pressure PM (kgf/cm$^2$) as the step S104 in FIG. 2 does.

A step S306 following the step S305 decides whether or not the current rotational engine speed NE exceeds a predetermined reference speed KVAIR. The reference speed KVAIR is chosen to correspond to a criterion for a decision regarding whether air tends to enter hydraulic fluid in the VVT 50. When it is decided that the current rotational engine speed NE exceeds the reference speed KVAIR, or when it is decided that air tends to enter hydraulic fluid in the VVT 50, the program advances from the step S306 to a step S307. Otherwise, the program advances from the step S306 to a step S310.

The step S307 increments a value CVTAIR by "1". The value CVTAIR represents the time of continuation or the duration of the high-speed state.

A step S308 subsequent to the step S307 decides whether or not the high-speed continuation time CVTAIR exceeds a predetermined reference time KVFINH. The reference time KVFINH is chosen to correspond to a criterion for a decision regarding whether air tends to enter hydraulic fluid in the VVT 50. When it is decided that the high-speed continuation time CVTAIR exceeds the reference time KVFINH, or when it is decided that air tends to enter hydraulic fluid in the VTT 50, the program advances from the step S308 to a step S309. Otherwise, the program advances from the step S308 to a step S313.

The step S309 sets the count number CNEHIGH to a predetermined number KNEHIGH corresponding to a predetermined lapse of time after the end of high-speed operation. After the step S309, the current execution cycle of the program segment ends.

Accordingly, in the presence of the conditions under which air tends to enter hydraulic fluid in the VTT 50, main program steps for a trouble diagnosis on the VVT 50 remain unexecuted.

The step S310 clears the high-speed duration time CVTAIR to "0".

A step S311 following the step S310 decrements the count number CNEHIGH by "1". As previously indicated, the count number CNEHIGH relates to the lapse of time after the end of high-speed operation.

A step S312 subsequent to the step S311 decides whether or not the count number CNEHIGH is equal to "0". In the case where the count number CNEHIGH is decided to be "0", that is, in the case where it is decided that the predetermined time has elapsed since the end of the high-speed operation, the program advances from the step S312 to the step S313. Otherwise, the program exits from the step S312, and then the current execution cycle of the program segment ends.

Accordingly, in the case where the predetermined time has not yet elapsed since the end of the high-speed operation, main program steps for a trouble diagnosis on the VVT 50 remain unexecuted.

The step S313 calculates the absolute value |AVTT−AVTA| of the difference between the actual rotational angle AVTA and the target rotational angle AVTT which have been given by the steps S304 and S305. The step S313 decides whether or not the absolute value |AVTT−AVTA| of the difference exceeds the predetermined reference angular value KVDTA. When it is decided that the absolute value |AVTT−AVTA| of the difference exceeds the reference angular value KVDTA, the program advances from the step S313 to a step S314. In this case, it is thought that operation of the VVT 50 is wrong. When it is decided that the absolute value |AVTT−AVTA| of the difference does not exceed the reference angular value KVDTA, the program returns from the step S313 to the step S301. In this case, it is thought that operation of the VVT 50 is good.

The step S314 increments the wrong-operation continuation time CVDTA by "1". After the step S314, the program advances to a step S315.

The step S315 decides whether or not the wrong-operation continuation time CVDTA exceeds the predetermined reference time KTDTA. When it is decided that the wrong-operation continuation time CVDTA exceeds the reference time KTDTA, the program advances from the step S315 to a step S316. When it is decided that the wrong-operation continuation time CVDTA does not exceed the reference time KTDTA, the program returns from the step S315 to the step S303.

The step S316 sets a flag for indicating that the VVT 50 fails. In addition, the step S316 activates the warning lamp. After the step 3316, the current execution cycle of the program segment ends.

In the valve timing control apparatus of the third embodiment of this invention, it is thought that the conditions under which air tends to enter hydraulic fluid in VVT 50 occur when the rotational engine speed NE exceeds the reference speed KVAIR and the high-speed continuation time CVTAIR exceeds the reference time KVFINH. Also, the conditions under which air tends to enter hydraulic fluid in VVT 50 are thought to be present in the case where the predetermined time given by the count number CNEHIGH has not yet elapsed since the end of the high-speed operation. In fact, hydraulic fluid fed to the VVT 50 tends to be atomized and hence air tends to enter hydraulic fluid in the VVT 50 until the predetermined time has elapsed since the end of the high-speed operation. After the predetermined time has elapsed since the end of the high-speed operation, the atomization of the hydraulic fluid disappears. The execution of the trouble diagnosis on the VTT 50 is inhibited when the rotational engine speed NE exceeds the reference speed KVAIR and the high-speed continuation time CVTAIR exceeds the reference time KVFINH. Also, the execution of the trouble diagnosis on the VTT 50 is inhibited in the case where the predetermined time has not yet elapsed since the end of the high-speed operation. Thus, it is possible to prevent temporary wrong operation of the VTT 50, which is caused by the entry of air into hydraulic fluid, from being diagnosed as a failure of the VTT 50 under these conditions.

Fourth Embodiment

A fourth embodiment of this invention is similar to the first embodiment thereof except for design changes indicated later.

Figure 6:
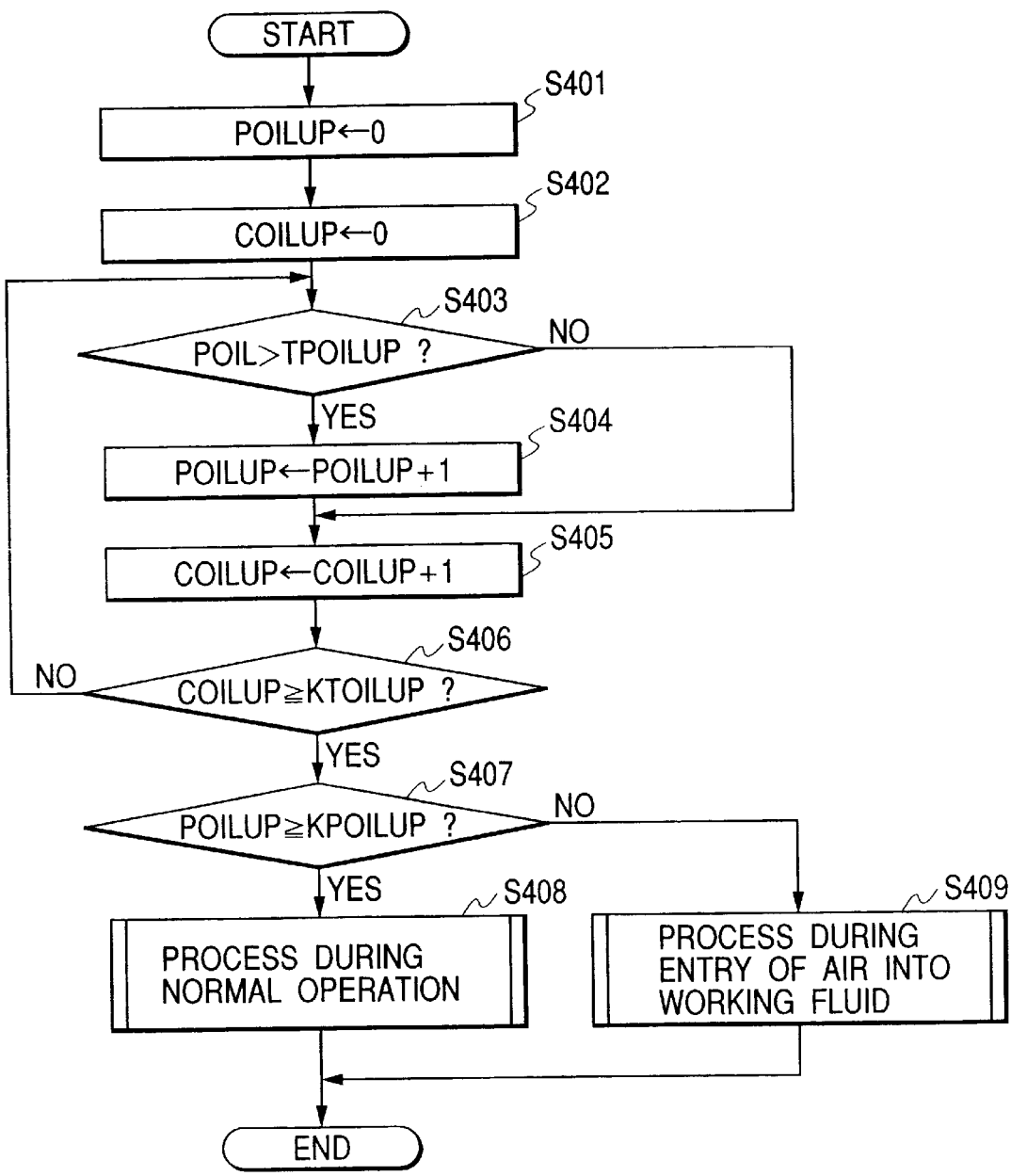
FIG. 6 is a flowchart of a segment of a program for an electronic control unit in a fourth embodiment of this invention.

In the fourth embodiment of this invention, the ECU 30 operates in accordance with a program stored in its internal ROM. FIG. 6 is a flowchart of a segment (routine) of the program which is designed to detect, in response to a hydraulic pressure, the occurrence of conditions where air tends to enter hydraulic fluid in the VVT 50. In the case where the engine 10 has four cylinders, the program segment in FIG. 6 is executed for every 180° CA (crank angle).

As shown in FIG. 6, a first step S401 of the program segment clears the variable POILUP to "0". The variable POILUP is used as an indication of a count number related to conditions in which the pressure of hydraulic fluid in the VVT 50 is normal.

A step S402 following the step S401 clears the variable COILUP to "0". The variable COILUP is used as an indication of a count number related to a time interval for a decision regarding whether the pressure of hydraulic fluid is normal or abnormal. After the step S402, the program advances to a step S403.

The step S403 derives the current value Poil of the actual pressure of hydraulic fluid from the output signal of the hydraulic pressure sensor 49. The actual hydraulic pressure Poil is equal to the pressure at the outlet of the pump 46. The step S403 reads the current value of the rotational engine speed NE. The step S403 determines a target hydraulic pressure TPOILUP on the basis of the current rotational engine speed NE.

Figure 7:
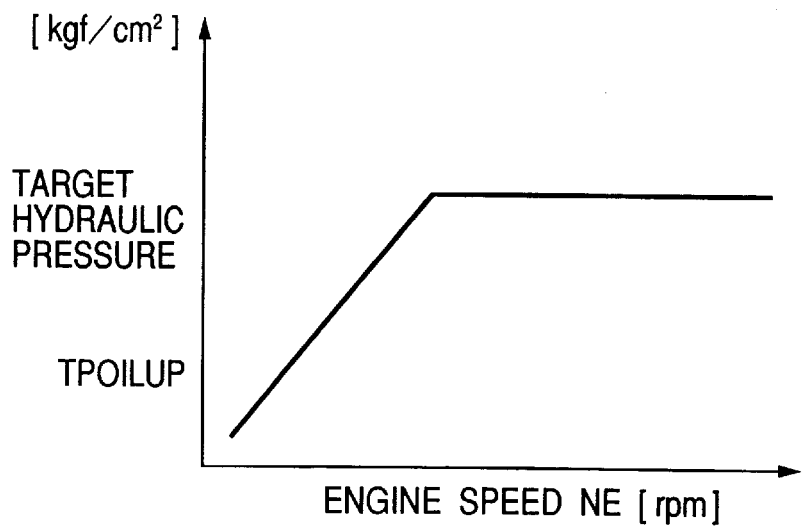
FIG. 7 is a diagram of a map which indicates a predetermined relation between a target hydraulic pressure TPOI-LUP and a rotational engine speed NE.

The ROM in the ECU 30 stores information of a map which indicates a predetermined relation between the target hydraulic pressure TPOILUP and the rotational engine speed NE. An example of the map is shown in FIG. 7. The step S403 implements the determination of the target hydraulic pressure TPOILUP by referring to the map in FIG. 7.

The step S403 decides whether or not the actual hydraulic pressure Poil exceeds the target hydraulic pressure TPOILUP. When it is decided that the actual hydraulic pressure Poil exceeds the target hydraulic pressure TPOILUP, the program advances from the step S403 to a step S404. In this case, the pressure of hydraulic pressure in the VVT 50 is thought to be normal. When it is decided that the actual hydraulic pressure Poil does not exceed the target hydraulic pressure TPOILUP, the program jumps from the step S403 to a step S405.

The step S404 increments the count number POILUP by "1". As previously indicated, the count number POILUP is related to the conditions in which the pressure of hydraulic fluid in the VVT 50 is normal. After the step S404, the program advances to the step S405.

The step S405 increments the count number COILUP by "1". As previously indicated, the count number COILUP is related to the time interval for the decision regarding whether the pressure of hydraulic fluid is normal or abnormal.

A step S406 following the step S405 compares the count number COILUP with a predetermined reference number KTOILUP corresponding to a predetermined time interval for the decision regarding whether the pressure of hydraulic fluid is normal or abnormal. When it is decided that the count number COILUP is equal to or greater than the reference number KTOILUP, the program advances from the step S406 to a step S407. Otherwise, the program returns from the step S406 to the step S403.

The step S407 compares the count number POILUP with a predetermined reference number KPOILUP. The reference number KPOILUP is chosen to satisfy the following condition. In the case where the pressure of hydraulic fluid in the VVT 50 remains normal, the count number POILUP which relates to the normality of the hydraulic pressure will reach the reference number KPOILUP in the predetermined time interval given by the reference number KTOILUP. When it is decided that the count number POILUP is equal to or greater than the reference number KPOILUP, the program advances from the step S407 to a step S408. When it is decided that the count number POILUP is smaller than the reference number KPOILUP, the program advances from the step S407 to a step S409.

The step S408 decides that the conditions under which air tends to enter hydraulic fluid in the VVT 50 are absent. The step S408 subjects the VVT 50 to processes designed for normal operation of the VVT 50. After the step S408, the current execution cycle of the program segment ends.

The step S409 decides that the conditions under which air tends to enter hydraulic fluid in the VVT 50 are present. The step S409 inhibits the trouble diagnosis on the VTT 50 from being implemented as in the first embodiment of this invention. Alternatively, the step S409 may correct the target rotational angle AVTT toward the retarded angle side as in the second embodiment of this invention. After the step S409, the current execution cycle of the program segment ends.

In the valve timing control apparatus of the fourth embodiment of this invention, the decision regarding the presence and the absence of the conditions under which air tends to enter hydraulic fluid in VVT 50 is implemented on the basis of the pressure of hydraulic fluid. When the pressure of hydraulic fluid fed to the VVT 50 is abnormal, there is a high chance of the entry of air into hydraulic fluid. Accordingly, it is thought that the conditions under which air tends to enter hydraulic fluid in VVT 50 occur when the pressure of hydraulic fluid is abnormal. The execution of the trouble diagnosis on the VTT 50 is inhibited or the target rotational angle AVTT is corrected toward the retarded angle side when the pressure of hydraulic fluid is abnormal. Thus, it is possible to prevent temporary wrong operation of the VTT 50, which is caused by the entry of air into hydraulic fluid, from being diagnosed as a failure of the VTT 50 under these conditions.

Fifth Embodiment

A fifth embodiment of this invention is similar to the first embodiment thereof except for design changes indicated later.

Figure 8:
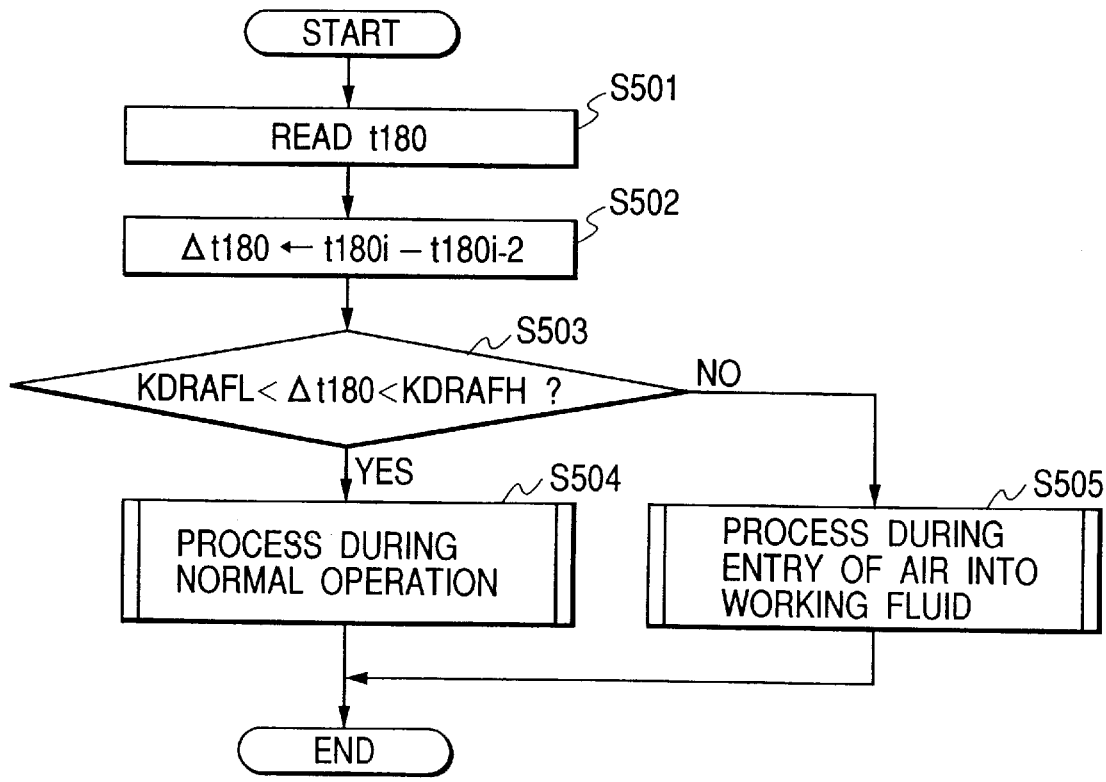
FIG. 8 is a flowchart of a segment of a program for an electronic control unit in a fifth embodiment of this invention.

In the fifth embodiment of this invention, the ECU 30 operates in accordance with a program stored in its internal ROM. FIG. 8 is a flowchart of a segment (routine) of the program which is designed to detect, in response to vehicle traveling conditions, the occurrence of conditions where air tends to enter hydraulic fluid in the VVT 50. In the case where the engine 10 has four cylinders, the program segment in FIG. 8 is executed for every 180° CA (crank angle).

As shown in FIG. 8, a first step S501 of the program segment reads the current time t180i during which the crankshaft 11 rotates through 180° CA (crank angle). The step S501 stores information of the current time t180i into the RAM within the ECU 30 for later use.

A step S502 following the step S501 calculates a time difference Δt equal to the current time t180i minus the previous time t180-2 given by the step S501 in the execution cycle of the program segment which second-immediately precedes the current execution cycle of the program segment. The vehicle can be decided to be traveling on a rough road if the time difference Δt is outside a given range.

A step S503 subsequent to the step 3502 decides whether or not the time difference At is between a predetermined lower limit value KDRAFL and a predetermined upper limit value KDRAFH. When the time difference At is between the lower limit value KDRAFL and the upper limit value KDRAFH, it is decided that the vehicle is travelling on a flat road. In this case, the conditions under which air tends to enter hydraulic fluid in the VVT 50 are decided to be absent, and the program advances from the step S503 to a step S504. When the time difference Δt is not between the lower limit value KDRAFL and the upper limit value KDRAFH, it is decided that the vehicle is travelling on a rough road. In this case, the conditions under which air tends to enter hydraulic fluid in the VVT 50 are decided to be present, and the program advances from the step S503 to a step S505.

The step S504 confirms that the conditions under which air tends to enter hydraulic fluid in the VVT 50 are absent. The step S504 subjects the VVT 50 to processes designed for normal operation of the VVT 50. After the step S504, the current execution cycle of the program segment ends.

The step S505 confirms that the conditions under which air tends to enter hydraulic fluid in the VVT 50 are present. The step S505 inhibits the trouble diagnosis on the VTT 50 from being implemented as in the first embodiment of this invention. Alternatively, the step S505 may correct the target rotational angle AVTT toward the retarded angle side as in the second embodiment of this invention. After the step S505, the current execution cycle of the program segment ends.

In the valve timing control apparatus of the fifth embodiment of this invention, it is thought that the conditions under which air tends to enter hydraulic fluid in VVT 50 occur when the vehicle is traveling on a rough road. In fact, the level of hydraulic fluid fed to the VVT 50 is unstable and hence air tends to enter hydraulic fluid when the vehicle is traveling on a rough road. The execution of the trouble diagnosis on the VTT 50 is inhibited or the target rotational angle AVTT is corrected toward the retarded angle side when the vehicle is traveling on the rough road. Thus, it is possible to prevent temporary wrong operation of the VTT 50, which is caused by the entry of air into hydraulic fluid, from being diagnosed as a failure of the VTT 50 under these conditions.

The valve timing control apparatus of the fifth embodiment of this invention decides whether the vehicle is traveling on a rough road or a flat road on the basis of a change in the time t180 during which the crankshaft 11 rotates through 180° CA (crank angle). The decision regarding whether the vehicle is traveling on a rough road or a flat road may be implemented on the basis of the output signal of a G sensor for detecting the acceleration of the vehicle body, the output signal of a height sensor for detecting the relative distance between the vehicle wheels and the vehicle body, or the output signals of sensors for detecting the rotational speeds of the vehicle wheels.

Sixth Embodiment

Figure 9:
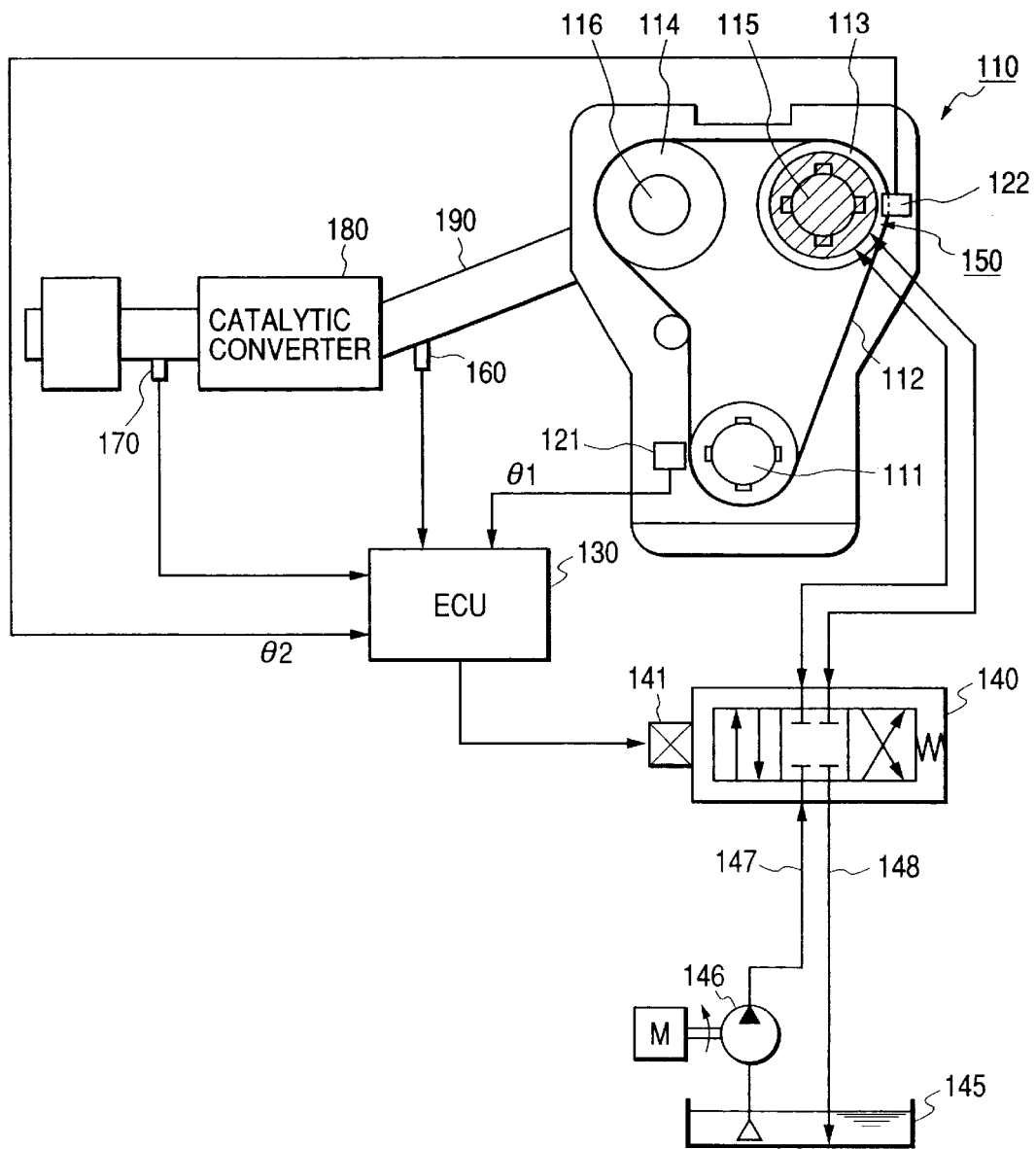
FIG. 9 is a diagram of an internal combustion engine of the double over head camshaft type, a valve timing control apparatus, and an engine control apparatus according to a sixth embodiment of this invention.

With reference to FIG. 9, a valve timing control apparatus of a sixth embodiment of this invention operates for an internal combustion engine 110 having a crankshaft 111 which serves as a driving shaft with respect to a variable valve timing control mechanism 150. The valve timing control apparatus contains the variable valve timing control mechanism 150.

The crankshaft 111 is connected to a pair of chain sprockets 113 and 114 via a chain 112 in the valve timing control apparatus. A drive force can be transmitted from the crankshaft 111 to the chain sprockets 13 and 114. As the crankshaft 111 rotates, the chain sprockets 113 and 114 also rotate. Generally, the rotational speed of the chain sprockets 113 and 114 is equal to half the speed of rotation of the crankshaft 111. The chain sprocket 113 is connected to a camshaft 115 for driving engine-cylinder inlet valves (not shown). Normally, the camshaft 115 rotates together with the chain sprocket 113. The camshaft 115 serves as a driven shaft with respect to the variable valve ting control mechanism 150. The chain sprocket 114 is mounted on a camshaft 116 for driving engine-cylinder outlet valves (not shown). The camshaft 116 rotates together with the chain sprocket 114.

A crankshaft position sensor 121 is associated with the crankshaft 111. The crankshaft position sensor 121 outputs a pulse signal θ1 representing the angular position of the crankshaft 111. A camshaft position sensor 122 is associated with the camshaft 115. The camshaft position sensor 122 outputs a pulse signal θ2 representing the angular position of the camshaft 115.

An electronic control unit (ECU) 130 receives the output signals θ1 and θ2 of the crankshaft position sensor 121 and the camshaft position sensor 122. The ECU 130 includes a microcomputer or a logic operation circuit having a combination of a CPU, a ROM, a general RAM, a backup RAM, an input/output port, and bus lines. The ECU 130 operates in accordance with a program stored in the ROM.

The engine 110 has an exhaust passage 190 which can communicate with the engine cylinders via the engine-cylinder outlet valves. A three-way catalytic converter 180 is disposed in the exhaust passage 190. A front $O_2$ sensor 160 is located in a region of the exhaust passage 190 upstream of the three-way catalytic converter 180. The front $O_2$ sensor 160 is exposed to exhaust gas, and outputs a signal to the ECU 130 which represents the $O_2$ concentration of the exhaust gas. A rear $O_2$ sensor 170 is located in a region of the exhaust passage 190 downstream of the three-way catalytic converter 180. The rear $O_2$ sensor 170 is exposed to exhaust gas, and outputs a signal to the ECU 130 which represents the $O_2$ concentration of the exhaust gas.

The engine 110 is provided with a known fuel vapor treating apparatus (not shown) including a canister. Fuel vapor generated in a fuel tank is absorbed by the canister, being transmitted from the canister to an air intake passage of the engine 110.

An air flow meter (not shown) detects the rate GN of air flow into the engine cylinders. The ECU 130 receives an output signal of the air flow meter which represents the detected air flow rate GN.

A temperature sensor (not shown) detects the temperature of coolant in the engine 110. The ECU 130 receives an output signal of the temperature sensor which represents the detected engine coolant temperature.

The ECU 130 calculates an actual rotational angle AVTA of the camshaft 115 relative to the crankshaft 111 on the basis of the output signals θ1 and θ2 of the crankshaft position sensor 121 and the camshaft position sensor 122. In addition, the ECU 130 calculates a target rotational angle AVTT of the camshaft 115 relative to the crankshaft 111 on the basis of the output signals of sensors including the crankshaft position sensor 121 and the air flow meter. Furthermore, the ECU 130 calculates the rotational engine speed NE, that is, the speed of rotation of the crankshaft 111 on the basis of the output signal θ1 of the crankshaft position sensor 121.

A spool valve 140 which serves as an oil-flow control valve (OCV) can be actuated by a linear solenoid 141. The spool valve 140 is disposed in hydraulic passages extending among a tank 145, a pump 146, and the variable valve timing control mechanism (VVT) 150. The tank 145 contains hydraulic fluid. The pump 146 draws hydraulic fluid from the tank 145, and pumps hydraulic fluid toward the VVT 150 via a fluid feed passage 147 and the spool valve 140. The state or the position of the spool valve 140 is controlled by the linear solenoid 141. The spool valve 140 can adjust the rate of hydraulic-fluid flow to the VVT 150 in response to the duty cycle or the duty factor of a drive pulse signal applied to the linear solenoid 141. The VVT 150 is provided between the chain sprocket 113 and the camshaft 115. The VVT 150 varies the angular difference (the phase difference) between the sprocket 113 and the camshaft 115, that is, the rotational angle of the camshaft 115 relative to the crankshaft 111 in response to hydraulic fluid fed via the spool valve 140. Hydraulic fluid can return from the VVT 150 to the tank 145 via the spool valve 140 and a fluid return passage 148.

The ECU 130 calculates the difference between the actual rotational angle AVTA and the target rotational angle AVTT of the camshaft 115 relative to the crankshaft 111. The ECU 130 generates a fixed-frequency drive pulse signal for the linear solenoid 141 which has a duty cycle or a duty factor depending on the calculated difference between the actual rotational angle AVTA and the target rotational angle AVTT of the camshaft 115 relative to the crankshaft 111. Thereby, the actual rotational angle AVTA of the camshaft 115 relative to the crankshaft 111 can be equalized to the target rotational angle AVTT thereof.

The crankshaft position sensor 121 and the camshaft position sensor 122 are designed to implement the following processes. During every revolution of the crankshaft 111, N pulses are successively outputted from the crankshaft position sensor 121. Here, N denotes a predetermined natural number. During every revolution of the camshaft 115, N pulses are successively outputted from the camshaft position sensor 122. The number N is chosen to satisfy a condition as "N<360/θmax" where θmax denotes the maximum value of timing conversion related to the camshaft 115 which is expressed in unit of degree in crank angle (CA). Accordingly, a pulse in the output signal θ1 of the crankshaft position sensor 121, and a pulse in the output signal $O_2$ of the camshaft position sensor 122 which occurs immediately after the pulse in the signal θ1 can be used in calculating the actual rotational angle AVTA of the camshaft 115 relative to the crankshaft 111.

Figure 10:
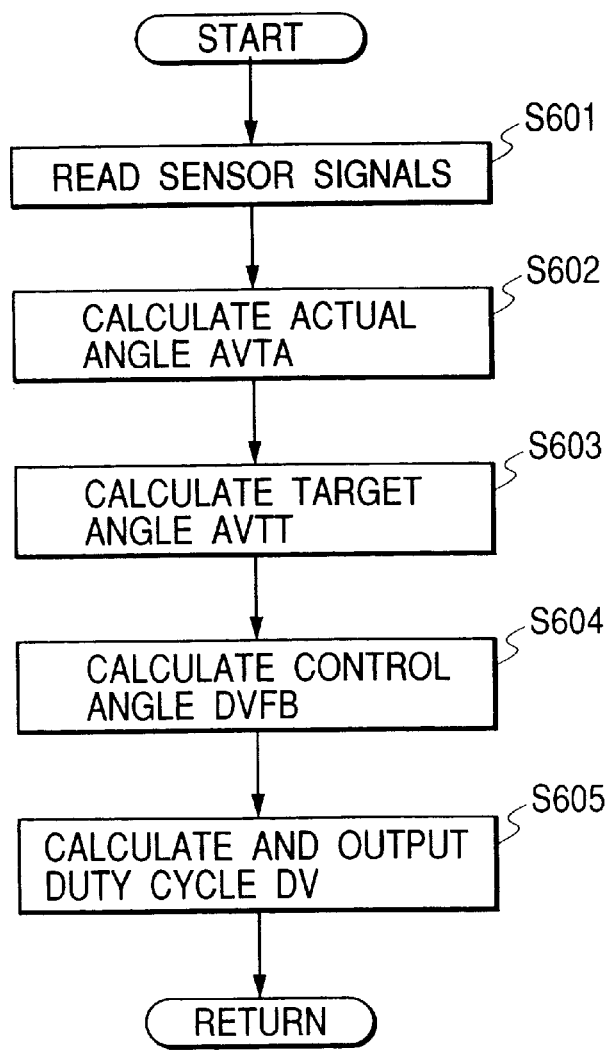
FIG. 10 is a flowchart of a first segment of a program for an electronic control unit in FIG. 9.

As previously explained, the ECU 130 operates in accordance with a program stored in its internal ROM. FIG. 10 is a flowchart of a segment (routine) of the program which is designed to control the duty cycle of the drive pulse signal fed to the linear solenoid 141. The program segment in FIG. 10 is executed for every given time interval.

As shown in FIG. 10, a first step S601 of the program segment reads the current states of the output signals θ1 and θ2 of the crankshaft position sensor 121 and the camshaft position sensor 122. The step S601 reads the current value of the rotational engine speed NE. The step S601 derives the current value GN of the air flow rate from the output signal of the air flow meter.

A step S602 following the step S601 calculates the actual rotational angle AVTA of the camshaft 115 relative to the crankshaft 111 from the current states of the output signals θ1 and θ2 of the crankshaft position sensor 121 and the camshaft position sensor 122 by referring to an equation as "AVTA=θ1−θ2".

A step S603 subsequent to the step S602 calculates the target rotational angle AVTT of the camshaft 115 relative to the crankshaft 111 from the current rotational engine speed NE and the current air flow rate GN.

Figure 11:
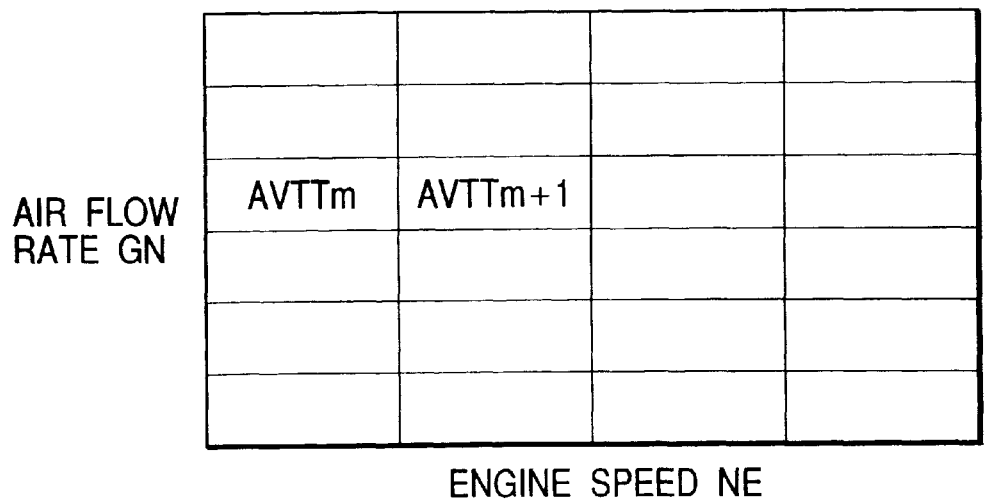
FIG. 11 is a diagram of a table map which indicates a predetermined relation among a target rotational angle AVTT, a rotational engine speed NE, and an air flow rate GN.

The ROM in the ECU 130 stores information of a table map which indicates a predetermined relation among the target rotational angle AVTT, the rotational engine speed NE, and the air flow rate GN. An example of the table map is shown in FIG. 11. The step S603 implements the calculation of the target rotational angle AVTT by referring to the table map in FIG. 11.

A step S604 following the step S603 calculates a rotational angle difference which is equal to the target rotational angle AVTT minus the actual rotational angle AVTA. The step S604 determines a control rotational angle DVFB on the basis of the calculated rotational angle difference "AVTT−AVTA". The control rotational angle DVFB corresponds to a feedback corrective quantity.

Figure 12:
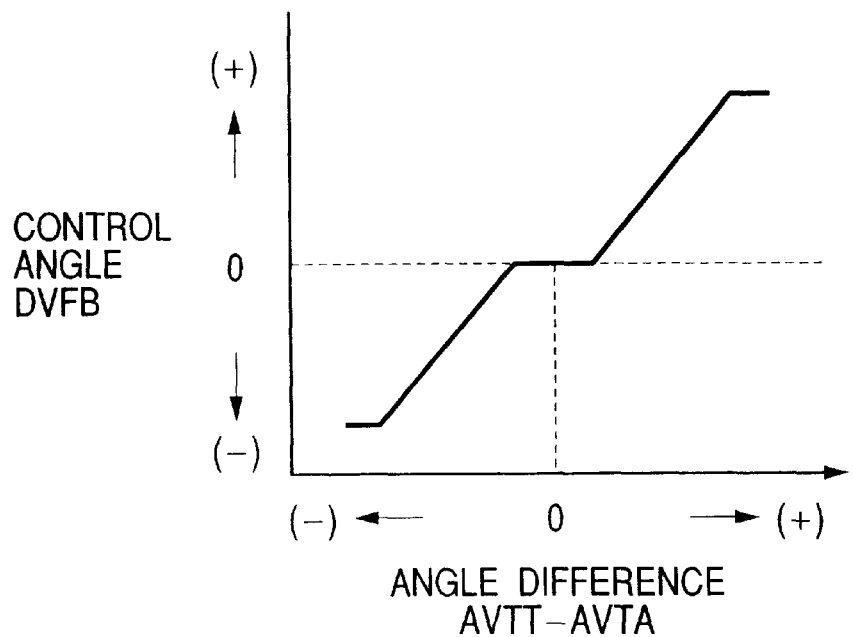
FIG. 12 is a diagram of a map which indicates a predetermined relation between a control rotational angle DVFB and a rotational angle difference "AVTT–AVTA".

The ROM in the ECU 130 stores information of a map which indicates a predetermined relation between the control rotational angle DVFB and the rotational angle difference "AVTT−AVTA". An example of the map is shown in FIG. 12. The step S604 implements the determination of the control rotational angle DVFB by referring to the map in FIG. 12.

A step S605 subsequent to the step S604 calculates a desired duty cycle DV of the drive pulse signal to the linear solenoid 141 from the control rotational angle DVFB and a basic duty value DVT according to the following equation.

$$DV=DVT+DVFB$$

Figure 13:
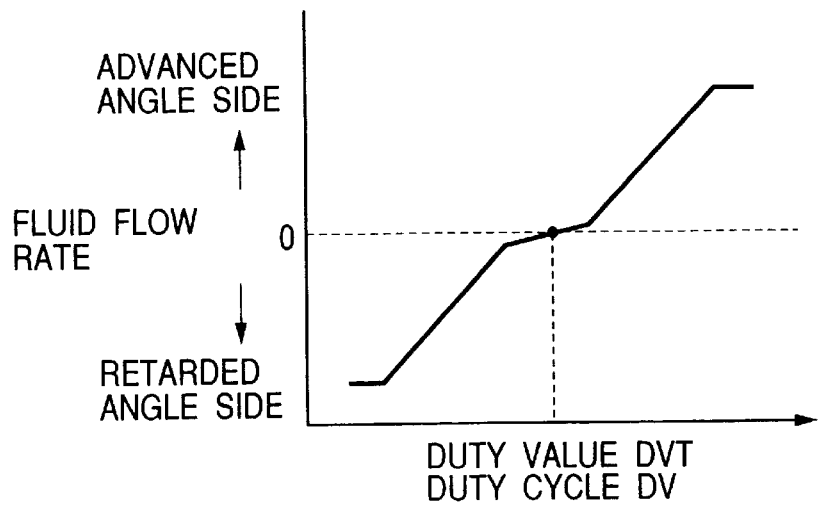
FIG. 13 is a diagram of a relation between a rate of hydraulic fluid flow into a variable valve timing control mechanism and a desired duty cycle DV or a basic duty value DVT.

The basic duty value DVT is a term for maintaining the actual rotational angle AVTA at the current value. As shown in FIG. 13, the rate of hydraulic fluid flow into the VVT 150 depends on the desired duty cycle DV or the basic duty value DVT.

In other words, the step S605 corrects and updates the desired duty cycle DV in response to the control rotational angle DVFB according to a program statement as "DV= DV+DVFB".

The step S605 outputs a drive pulse signal to the linear solenoid 141 which has a duty cycle equal to the desired duty cycle DV. After the step S605, the current execution cycle of the program segment ends and the program returns to the main routine.

According to the program segment in FIG. 10, the valve timing control apparatus enables the actual rotational angle AVTA to follow the target rotational angle AVTT. Thus, the valve timing control apparatus can be decided to be wrong in the case where the actual rotational angle AVTA continues to differ from the target rotational angle AVTT by a given value or more during at least a given time interval.

Figure 14:
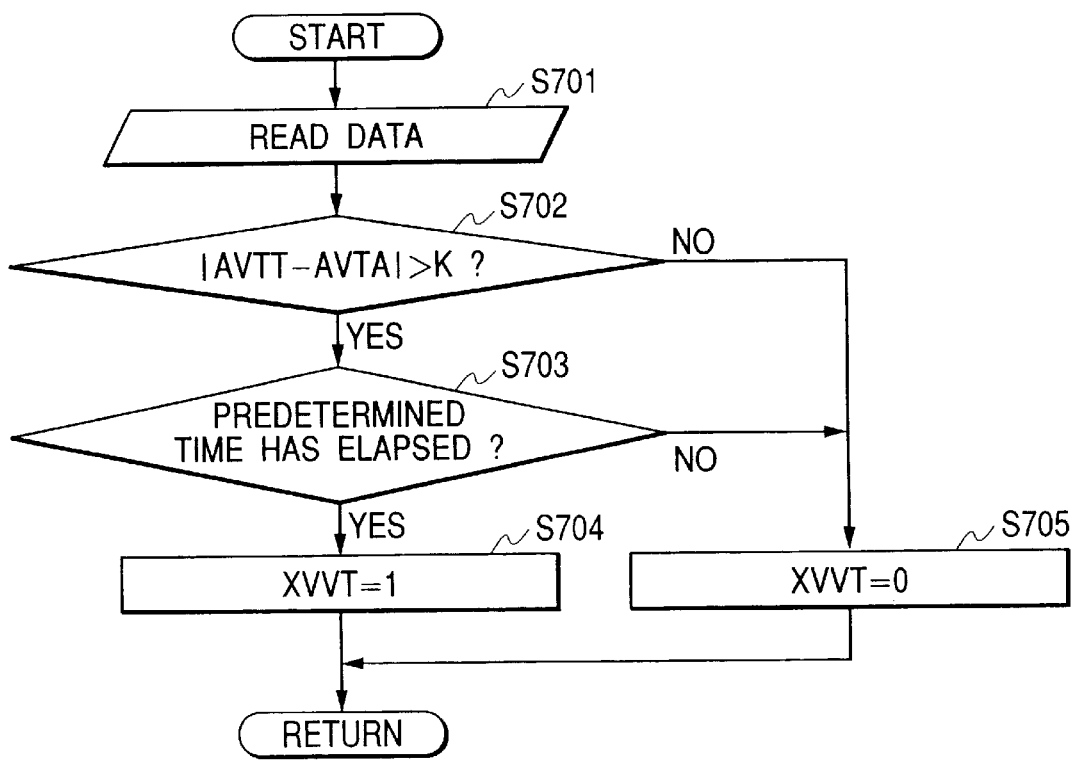
FIG. 14 is a flowchart of a second segment of the program for the electronic control unit in FIG. 9.

FIG. 14 is a flowchart of another segment (routine) of the program for the ECU 130 which is designed to diagnose a trouble in or a failure of the valve timing control apparatus. In the case where the engine 110 has four cylinders, the program segment in FIG. 14 is executed for every 180° CA (crank angle).

As shown in FIG. 14, a first step S701 of the program segment reads the current value of the target rotational angle AVTT, the current value of the actual rotational angle AVTA, and a predetermined reference value "k".

A step S702 calculates the absolute value |AVTT−AVTA| of the difference between the actual rotational angle AVTA and the target rotational angle AVTT which have been read by the step S701. The step S702 decides whether or not the absolute value |AVTT−AVTA| of the difference exceeds the reference value "k". When it is decided that the absolute value |AVTT−AVTA| of the difference exceeds the reference value "k", the program advances from the step S702 to a step S703. Otherwise, the program advances from the step S702 to a step 3705.

The step S703 decides whether or not a predetermined time interval has elapsed since the moment at which the absolute value |AVTT−AVTA| of the difference starts to exceed the reference value "k". When it is decided that the predetermined time interval has elapsed, the program advances from the step S703 to a step S704. In this case, it is thought that the valve timing control apparatus is wrong. When it is decided that the predetermined time interval has not yet elapsed, the program advances from the step S703 to the step S705.

The step S704 sets an abnormality indication flag XVVT to "1". After the step S704, the current execution cycle of the program segment ends and the program returns to the main routine.

The step S705 sets the abnormality indication flag XVVT to "0". After the step S705, the current execution cycle of the program segment ends and the program returns to the main routine.

The ECU 130 is connected to an ignition device (not shown) of the engine 10. The ECU 130 adjusts the ignition device to control a spark timing in the engine 110.

Figure 15:
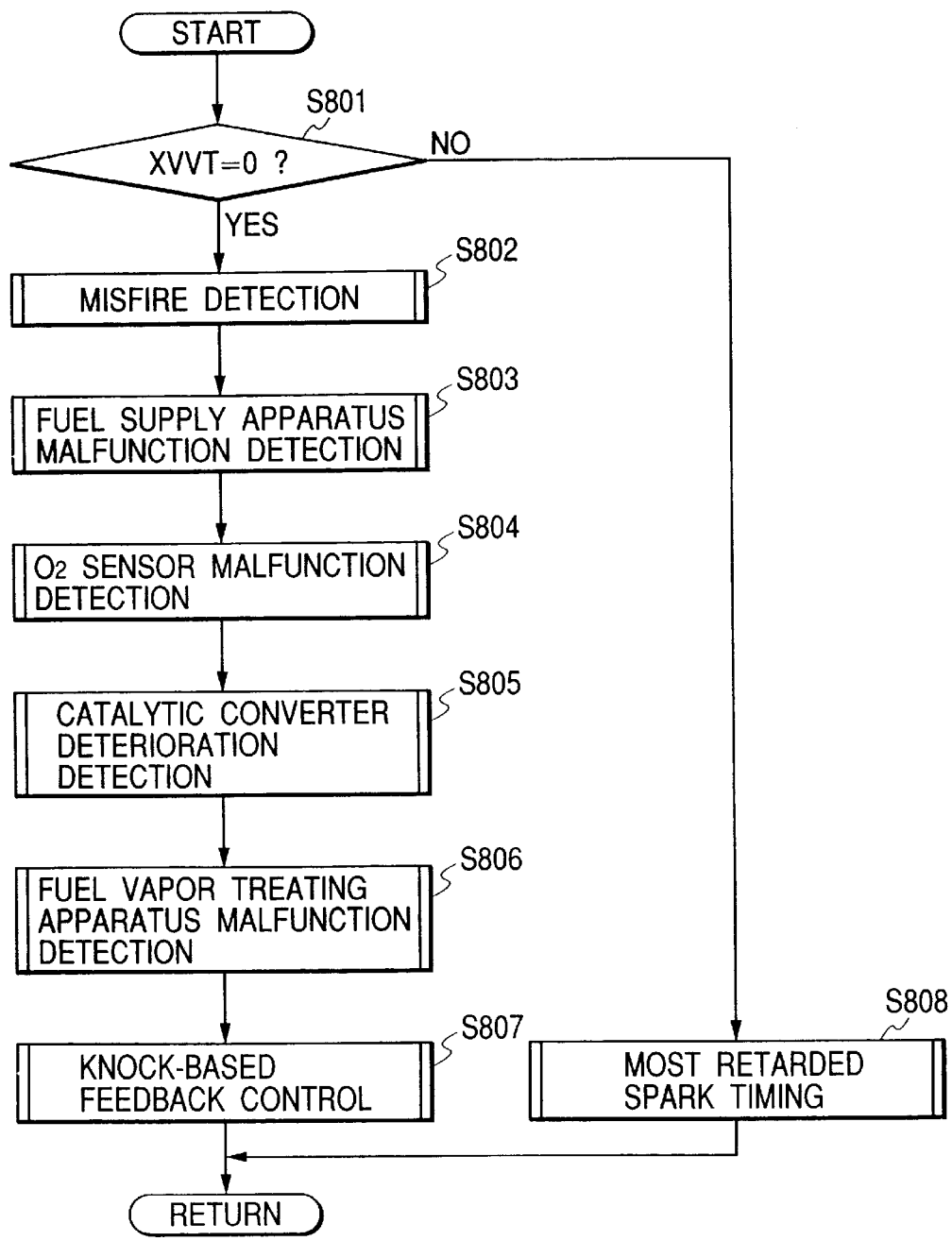
FIG. 15 is a flowchart of a third segment of the program for the electronic control unit in FIG. 9.

FIG. 15 is a flowchart of still another segment (routine) of the program for the ECU 130 which is designed to control a spark timing in the engine 110 and to implement various malfunction detection processes. The program segment in FIG. 15 is executed for every given crank angle.

As shown in FIG. 15, a first step S801 of the program segment decides whether or not the abnormality indication flag XVVT is equal to "0". When it is decided that the abnormality indication flag XVVT is equal to "0", that is, when it is decided that the valve timing control apparatus is normal, the program advances from the step S801 to a block S802. Otherwise, the program advances from the step S801 to a block S808.

The block S802 implements a misfire detection process related to the engine 110.

A block S803 following the block S802 implements a process of detecting malfunction of a fuel supply apparatus of the engine 110.

A block S804 subsequent to the block S803 implements a process of detecting malfunction of the front $O_2$ sensor 160, and also a process of detecting malfunction of the rear $O_2$ sensor 170.

A block S805 following the block S804 implements a process of detecting deterioration of the three-way catalytic converter 180.

A block S806 subsequent to the block S805 implements a process of detecting malfunction of the fuel vapor treating apparatus.

A block S807 following the block S806 executes feedback control of the spark timing in response to knocking conditions in the engine 110. After the block S807, the current execution cycle of the program segment ends and the program returns to the main routine.

The block S808 implements a fail-safe process. After the block S808, the current execution cycle of the program segment ends and the program returns to the main routine.

The engine 110 is provided with various devices and apparatuses which might be adversely affected by wrong operation of the valve timing control apparatus. The fail-safe process implemented by the block S808 includes a step of inhibiting trouble diagnoses on these devices and apparatuses. The fail-safe process also includes a step of interrupting the knocking-based feedback control of the spark timing, and a step of forcedly setting the spark timing to the most retarded timing (the retarded-side limit timing).

If the valve timing control apparatus fails, the valve timing is wrong and hence operation of the engine 110 is unstable. Especially, if the valve timing control apparatus fails at an advanced spark timing and at a low engine load, the valve overlap is large and thus the burning in the engine 110 is impaired so that misfire tends to occur. If the misfire is detected and parts of the engine 110 are erroneously decided to be wrong, some of good parts may be replaced although only the valve timing control apparatus is wrong. Accordingly, when malfunction of the valve timing control apparatus is detected, the misfire detection process is interrupted by the block S808 to prevent erroneous replacement of good parts.

If the valve timing control apparatus fails, the burning in the engine 110 is impaired. In this case, the burning in the engine 110 is not improved although the ECU 130 feeds a proper feedback control signal to the fuel supply apparatus. Thus, in this case, the fuel supply apparatus, the front $O_2$ sensor 160, the rear $O_2$ sensor 170, and the three-way catalytic converter 180 might be erroneously decided to be wrong. Accordingly, when malfunction of the valve timing control apparatus is detected, the process of detecting malfunction of the fuel supply apparatus of the engine 110, the process of detecting malfunction of the front $O_2$ sensor 160, the process of detecting malfunction of the rear $O_2$ sensor 170, and the process of detecting deterioration of the three-way catalytic converter 180 are interrupted by the block S808 to prevent erroneous decisions.

The process of detecting malfunction of the fuel vapor treating apparatus includes a step of deciding whether or not a vacuum can be normally introduced into the fuel vapor treating apparatus from the air intake passage of the engine 110. If a hole is made in the fuel vapor treating apparatus, a vacuum can not be normally introduced into the fuel vapor treating apparatus since the vacuum escapes from the hole. If the valve timing control apparatus fails, the burning is impaired and the pressure in the air intake passage of the engine 110 rises. Thus, in this case, since a vacuum can not be normally introduced into the fuel vapor treating apparatus, the fuel vapor treating apparatus may be erroneously decided to be wrong. Accordingly, when malfunction of the valve timing control apparatus is detected, the process of detecting malfunction of the fuel vapor treating apparatus is interrupted by the block S808 to prevent an erroneous decision.

If the valve timing control apparatus fails, the valve timing is wrong and the charging efficiency varies so that the spark timing is improper. At intermediate and heavy engine loads, the variable valve timing control mechanism 150 is set to an advanced angle side to meet requirements related to fuel economy and emission control. If the variable valve timing control mechanism 150 is set to an advanced angle side, the internal EGR (exhaust gas recirculation) rate increases and hence the knock limit of the spark timing shifts toward an advanced angle side. If the variable valve timing control mechanism 150 is fixed to a retarded angle side due to malfunction of the valve timing control apparatus, the knock limit is in a retarded angle side so that knocking tends to occur. Accordingly, when malfunction of the valve timing control apparatus is detected, the block S808 interrupts the knocking-based feedback control of the spark timing, and forcedly sets the spark timing to the most retarded timing (the retarded-side limit timing).

It should be noted that when malfunction of the valve timing control apparatus is detected, the knocking-based feedback control of the spark timing may be held active. In this case, it is preferable that the knocking-based feedback control of the spark timing is made more sensitive by increasing a retardation angle quantity of the feedback gain.

As previously explained, when the valve timing control apparatus fails, the various trouble diagnoses or the various abnormality detection processes are interrupted to prevent wrong diagnoses or wrong detections. Thus, it is possible to prevent good parts from being erroneously replaced. The prevention of wrong diagnoses or wrong detections results in increases in the reliabilities of the various trouble diagnoses or the various abnormality detection processes. When the valve timing control apparatus fails, the spark timing is forcedly set to the most retarded timing (the retarded-side limit timing). Thus, it is possible to prevent the occurrence of knocking, and to protect the engine 110.

The valve timing control apparatus may be of another type such as the cam change type, the lift amount variable time, or the cam phase/lift amount variable type. The method of detecting malfunction of the valve timing control apparatus may be replaced by another method.

Trouble diagnoses or abnormality detection processes on other devices may be interrupted when the valve timing control apparatus fails. For example, an abnormality detection process on the crankshaft position sensor 121 or the camshaft position sensor 122 may be interrupted. At least one of the trouble diagnoses or the abnormality detection processes may be interrupted.

The results of the abnormality detections may be invalidated instead of interrupting the abnormality detection processes. Specifically, in the case where the step S801 decides the abnormality indication flag XVVT to be equal to "1", the abnormality detection processes on the various devices and apparatuses are continued and the results of the abnormality detections are invalidated. The abnormality detection processes may be substantially disabled by relaxing the criteria for the decisions regarding whether the devices and apparatuses are normal or abnormal.

What is claimed is:

1. A control apparatus for an internal combustion engine, comprising:
   a valve timing control apparatus for controlling at least one of a valve lift amount, a valve timing related to an engine-cylinder inlet valve, and a valve timing related to an engine-cylinder outlet valve;
   first malfunction detecting means for detecting malfunction of the valve timing control apparatus;
   fail-safe means for implementing fail-safe on the engine when the first malfunction detecting means detects malfunction of the valve timing control apparatus;
   second malfunction detecting means for detecting malfunction of a second apparatus provided on the engine which is affected by malfunction of the valve timing control apparatus; and inhibiting means contained in the fail-safe means for inhibiting the second malfunction detecting means from detecting malfunction of the second apparatus.

2. A control apparatus according to claim 1, wherein the second malfunction detecting means comprises means for detecting misfire in the engine.

3. A control apparatus according to claim 1, wherein the second malfunction detecting means comprises means for detecting malfunction of a fuel supply apparatus.

4. A control apparatus according to claim 1, wherein the second malfunction detecting means comprises means for detecting malfunction of one of a front $O_2$ sensor and a rear $O_2$ sensor.

5. A control apparatus according to claim 1, wherein the second malfunction detecting means comprises means for detecting deterioration of a catalytic converter.

6. A control apparatus according to claim 1, wherein the second malfunction detecting means comprises means for detecting malfunction of a fuel vapor treating apparatus.

7. A control apparatus according to claim 1, further comprising:

feedback control means for implementing knock-based feedback control of a spark timing in the engine;

inhibiting means contained in the fail-safe means for inhibiting the feedback control means from implementing the knock-based feedback control of the spark timing; and spark timing control means contained in the fail-safe means for setting the spark timing to a first timing when the first malfunction detecting means detects malfunction of the valve timing control apparatus, the first timing being retarded from a second timing to which the spark timing is set when the first malfunction detecting means does not detect malfunction of the valve timing control apparatus.

8. A control apparatus according to claim 1, further comprising invalidating means for invalidating a result of the detecting by the second malfunction detecting means.

* * * * *